(12) United States Patent
Yonaha

(10) Patent No.: US 11,423,511 B2
(45) Date of Patent: Aug. 23, 2022

(54) IMAGE COMPOSITION METHOD, IMAGE COMPOSITION DEVICE, AND RECORDING MEDIUM

(71) Applicant: FUJIFILM Corporation, Tokyo (JP)

(72) Inventor: Makoto Yonaha, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 64 days.

(21) Appl. No.: 16/710,567

(22) Filed: Dec. 11, 2019

(65) Prior Publication Data

US 2020/0118247 A1    Apr. 16, 2020

Related U.S. Application Data

(63) Continuation of application No. PCT/JP2018/021001, filed on May 31, 2018.

(30) Foreign Application Priority Data

Jun. 28, 2017    (JP) .............................. JP2017-126205

(51) Int. Cl.
     *G06T 3/40*      (2006.01)
     *G06T 7/33*      (2017.01)
     *G06T 5/50*      (2006.01)

(52) U.S. Cl.
     CPC .............. *G06T 3/4038* (2013.01); *G06T 5/50* (2013.01); *G06T 7/337* (2017.01)

(58) Field of Classification Search
     CPC ......... G06T 3/4038; G06T 7/337; G06T 5/50; G06T 11/80; H04N 1/387; H04N 5/232
     See application file for complete search history.

(56) References Cited

U.S. PATENT DOCUMENTS 6,243,103 B1 *   6/2001   Takiguchi ............. G06T 3/4038
                                                            345/634
6,392,658 B1     5/2002   Oura
(Continued)

FOREIGN PATENT DOCUMENTS

JP       H0993431 A     4/1997
JP       H0997326 A     4/1997
(Continued)

OTHER PUBLICATIONS

The extended European search report issued by the European Patent Office dated Mar. 16, 2020, which corresponds to European Patent Application No. 18825419.7-1210 and is related to U.S. Appl. No. 16/710,567.

(Continued)

*Primary Examiner* — Charles T Shedrick
(74) *Attorney, Agent, or Firm* — Studebaker & Brackett PC

(57) ABSTRACT

The present invention provides an image composition method, an image composition device, and a recording medium that enable rapid and easy designation of correspondence points and image composition based on the designated correspondence points.

In an image composition method according to an aspect of the invention, in a case where all of a plurality of images are unable to be composed into one image, a plurality of images are divided into composable image groups, whereby correspondence points may be designated for one image group and another image group (that is, image groups not subjected to automatic composition) without need of designating correspondence points for all images. A plurality of images are displayed on a display device by composable image group, whereby it is possible to allow ascertainment of image groups for which correspondence points are designated. With the image composition method, it is possible to rapidly (Continued)

and easily perform designation of correspondence points and image composition based on the designated correspondence points.

13 Claims, 23 Drawing Sheets

(56) References Cited

U.S. PATENT DOCUMENTS

| | | | |
|---|---|---|---|
| 6,714,689 | B1 | 3/2004 | Yano et al. |
| 2003/0107586 | A1 | 6/2003 | Takiguchi et al. |
| 2011/0150326 | A1 | 6/2011 | Jeong et al. |
| 2012/0294583 | A1* | 11/2012 | Kosaka ............... G06T 13/80 386/230 |
| 2013/0155058 | A1* | 6/2013 | Golparvar-Fard ...... G06T 17/00 345/419 |
| 2014/0219582 | A1* | 8/2014 | Huang ............... H04N 5/23229 382/284 |
| 2016/0078584 | A1* | 3/2016 | Song ............... G06T 1/005 382/100 |

FOREIGN PATENT DOCUMENTS

| | | |
|---|---|---|
| JP | H10108003 A | 4/1998 |
| JP | 2000090232 A | 3/2000 |
| JP | 2006099497 A | 4/2006 |
| JP | 4006007 B2 | 11/2007 |
| JP | 2009-258651 A | 11/2009 |
| JP | 2010538258 A | 12/2010 |
| JP | 2017085297 A | 5/2017 |

OTHER PUBLICATIONS

Teng Wang et al.; "Coregistration Between SAR Image Subsets Using Pointwise Targets"; The Fringe 2011 Workshop; Sep. 19, 2011; pp. 1-6; Frascati, Italy.

Philippe Thevenaz et al.; "User-Friendly Semiautomated Assembly of Accurate Image Mosaics in Microscopy"; Microscopy Research and Technique; Jan. 1, 2007; pp. 135-146; vol. 70; No. 2; XP55671115.

Jeff Orchard et al.; "Registering a MultiSensor Ensemble of Images"; IEEE Transactions on Image Processing; May 1, 2010; pp. 1236-1247; vol. 19; No. 5; IEEE, Piscataway, NJ, USA.

Ghosh Debabrate et al.; "A survey on image mosaicing techniques"; Journal of Visual Communication and Image Representation; Oct. 30, 2015; pp. 1-11; vol. 34; XP029359757; Acadenic Press, Inc, USA.

An Office Action mailed by the Japanese Patent Office dated Oct. 6, 2020, which corresponds to Japanese Patent Application No. 2019-526734 and is related to U.S. Appl. No. 16/710,567; with English language translation.

Communication pursuant to Article 94(3) EPC issued by the European Patent Office dated Feb. 10, 2021, which corresponds to European Patent Application No. 18 825 419.7-1210 and is related to U.S. Appl. No. 16/710,567.

International Search Report issued in PCT/JP2018/021001; dated Jul. 3, 2018.

International Preliminary Report on Patentability and Written Opinion issued in PCT/JP2018/021001; dated Jul. 3, 2018.

\* cited by examiner

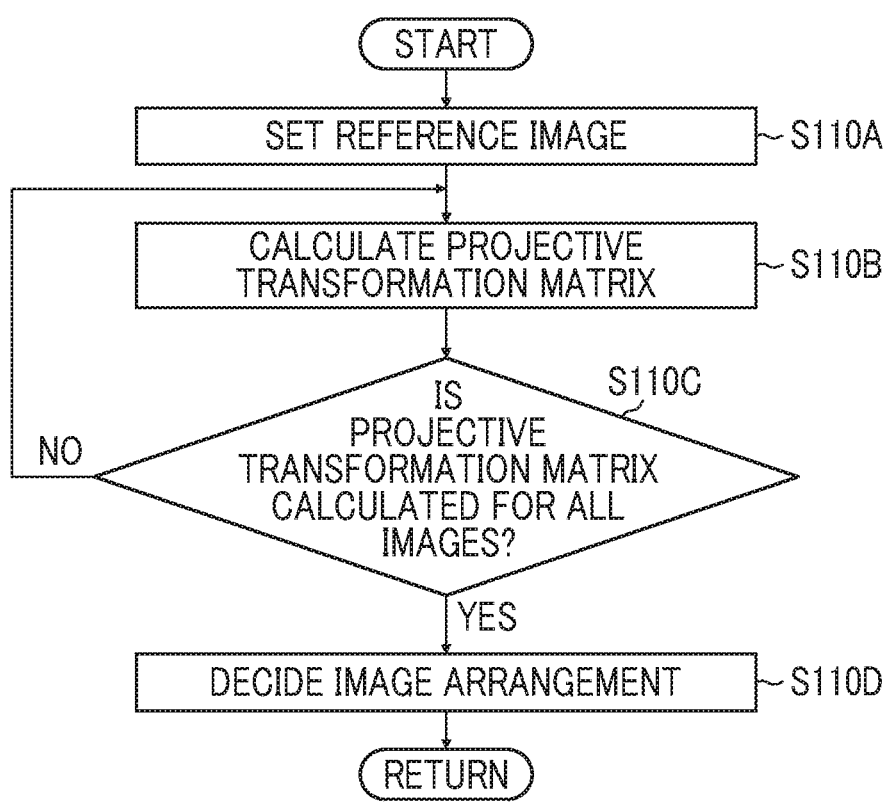

FIG. 14
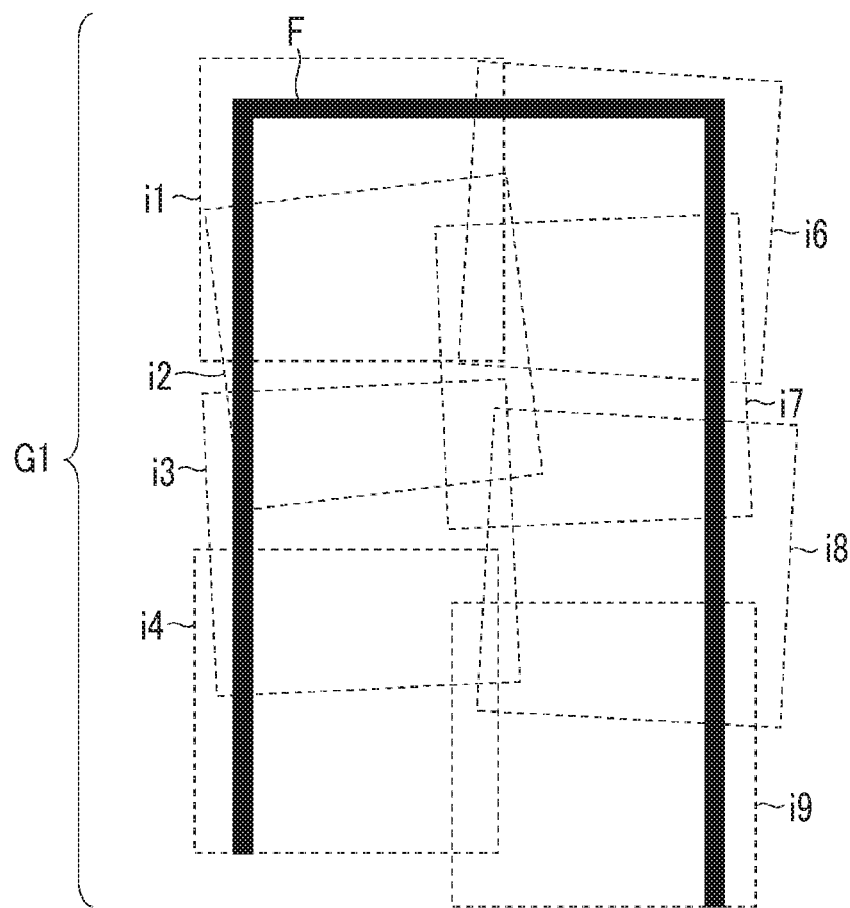
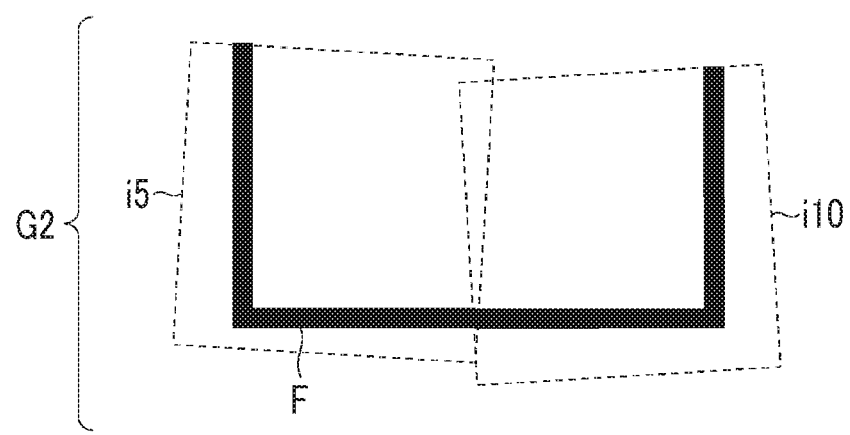
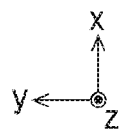

FIG. 23

| MEMBER NAME | MEMBER IDENTIFICATION INFORMATION | DAMAGE IDENTIFICATION INFORMATION | DAMAGE TYPE | DEGREE OF DAMAGE | DIMENSION | CAPTURED IMAGE | IMAGING DATE |
|---|---|---|---|---|---|---|---|
| MAIN GIRDER | Mg0201 | Mg0201-01 | CORROSION | RANK b | 0.2 m × 0.2 m | PHOTO-1 | 06.17.2017 |
| DECK SLAB | Ds0402 | Ds0402-01 | CRACK | RANK b | WIDTH 0.5 mm LENGTH 1.2 m | PHOTO-2 | 06.17.2017 |

IMAGE COMPOSITION METHOD, IMAGE COMPOSITION DEVICE, AND RECORDING MEDIUM

CROSS-REFERENCE TO RELATED APPLICATIONS

The present application is a Continuation of PCT International Application No. PCT/JP2018/021001 filed on May 31, 2018 claiming priority under 35 U.S.C § 119(a) to Japanese Patent Application No. 2017-126205 filed on Jun. 28, 2017. Each of the above applications is hereby expressly incorporated by reference, in its entirety, into the present application.

BACKGROUND OF THE INVENTION

1. Field of the Invention

The present invention relates to an image composition method, an image composition device, and a recording medium, and in particular, to a technique for composing a plurality of images acquired by subjecting a subject to split imaging.

2. Description of the Related Art

In a case where an image of a subject is captured, the subject may not be captured within one image under conditions of the type, size, and the like of the subject and may be subjected to split imaging into a plurality of images. In this case, a plurality of captured images are composed into one image through image processing. Image composition is performed by detecting correspondence point through block matching, for example, as described in JP2017-085297A. In regard to image composition through matching, in JP1998-108003A (JP-H10-108003A) describes that a plurality of images to be composed are roughly superimposed manually (initial arrangement is decided manually).

SUMMARY OF THE INVENTION

In image composition, image composition (automatic composition with an image processing device or the like) may fail due to a small image overlap, image blurriness, or the like. In this case, the user may perform composition by designating correspondence points. However. JP2017-085297A and JP1998-108003A (JP-H10-108003A) do not take into consideration countermeasures at composition failure. Furthermore, in a case where the designation of the correspondence points is completely manually performed like the superimposing operation in JP1998-108003A (JP-H10-108003A), the greater the number of images, the more an operation needs time and becomes complicated.

In this way, the technique of the related art has not rapidly and easily performed designation of correspondence points and image composition based on the designated correspondence points.

The invention has been accomplished in consideration of such a situation, and an object of the invention is to provide an image composition method, an image composition device, and a recording medium that enable rapid and easy designation of correspondence points and image composition based on the designated correspondence points.

In order to achieve the above-described object, a first aspect of the invention provides an image composition method comprising a step of receiving a plurality of images acquired by subjecting a subject to split imaging, a step of composing the plurality of images based on correspondence points of images, in a case where all of the plurality of images are unable to be composed into one image, a step of dividing the plurality of images into composable image groups, a step of deciding an image arrangement based on correspondence points of images by image group, a step of making a display device display the plurality of images in the decided image arrangement by image group, a step of designating correspondence point for one image group among the displayed image groups and another image group among the image groups, and a step of composing the one image group and the other image group based on the designated correspondence points.

In the image composition method according to the first aspect, in a case where all of a plurality of images are unable to be composed into one image, since a plurality of images are divided into composable image groups, it should suffice that the correspondence points are designated for one image group and another image group (that is, the image groups not subjected to automatic composition) without need of designating the correspondence points for all images. A plurality of images are displayed on the display device by composable image group, hereby it is possible to allow ascertainment of the image groups for which the correspondence points are designated. In this way, according to the first aspect, it is possible to enable rapid and easy designation of correspondence points and image composition based on the designated correspondence points. The designation of the correspondence points can be performed based on a user's operation.

In the first aspect, the number of images included in an "image group" does not matter, and it is assumed that a case where the number of images is one is included in an "image group". In the first aspect, the composable image groups may be displayed to be identifiable by image group. For example, the image groups can be displayed by changing a color by image group, by surrounding each image group with a frame, by providing a space between each image group and other image groups, or the like. The images constituting each image group may be or may not be composed in displaying a plurality of input images.

In the first aspect, a plurality of images to be composed may be acquired and input by an imaging device or the acquired and recorded images may be input by way of a network or a medium.

According to a second aspect, in the image composition method according to the first aspect, in the step of deciding the image arrangement, a reference image to be a reference of projective transformation among the plurality of images is set, a projective transformation matrix of an image other than the reference image among the plurality of images with respect to the reference image is calculated based on the correspondence points of the images, and the image arrangement is decided based on the calculated projective transformation matrix. According to the second aspect, an image other than the reference image is moved, rotated, or the like by the projective transformation matrix with respect to the reference image, and the image arrangement is decided. The reference image can be set based on a position (for example, an image in a corner portion) with respect to the subject, an imaging order (for example, an initially captured image), a feature (an exposure condition, sharpness, or a specific member is captured) of an image, or the like. It is preferable that an imaging surface of the reference image is in a confronting state in an imaging direction; however, the invention is not limited thereto. In a case where the imaging surface of the reference image is not in the confronting state, confronting correction can be performed after composition.

According to a third aspect, in the image composition method according to the first or second aspect, in the step of deciding the image arrangement, an image arrangement in which images do not overlap each other, is decided. The third aspect is to define an aspect of the image arrangement, and for example, the images can be arranged at intervals without changing the direction of each image to a direction obtained based on the projective transformation matrix.

According to a fourth aspect, in the image composition method according to the first or second aspect, in the step of deciding the image arrangement, an image arrangement in which overlapping areas between images overlap each other, is decided. The fourth aspect is to define another aspect of the image arrangement, and a manner in which the images are composed can be easily ascertained without composing the image.

According to a fifth aspect, the image composition method according to any one of the first to fourth aspects further comprises a step of composing images by image group, and in the step of displaying the plurality of images, the plurality of images are displayed with an image composed by image group.

According to a sixth aspect, in the image composition method according to the fifth aspect, in the step of composing the images by image group, in an area where a plurality of images overlap one another, one of the plurality of overlapping images is selected and the images are composed. According to the sixth aspect, it is possible to suppress blurriness due to misregistration of the images in the area where a plurality of images overlap one another, and to obtain sharp images.

According to a seventh aspect, the image composition method according to any one of the first to sixth aspects further comprises a step of changing a relative arrangement between the image groups based on a user's instruction input, and in the step of displaying the plurality of images, the plurality of images are displayed in the changed relative arrangement. In a case where the relative arrangement in the display is inappropriate (for example, in a case where the image groups that should be arranged up and down are arranged right and left), the relationship of the image groups may be hardly ascertained and a lot of time may be needed for designating the correspondence points. In contrast, as in the seventh aspect, the relative arrangement is changed based on the user's instruction input and the image groups are displayed, whereby it is possible to enable rapid and easy designation of correspondence points and image composition based on the designated correspondence points.

According to an eighth aspect, in the image composition method according to any one of the first to seventh aspects, in the step of receiving the plurality of images, a plurality of images acquired by subjecting a structure as the subject to split imaging are received. In a case where the structure (building) is the subject, since the imaging range is often wide and a plurality of images acquired by split imaging are composed and used (analysis or the like), the image composition method according to the eighth aspect is effective. Although a bridge, a building, a road, or the like can be exemplified an example of such a structure, the invention is not limited to these examples. The structure may be a concrete structure.

In order to achieve the above-described object, a ninth aspect provides an image composition device comprising an image input unit that receives a plurality of images acquired by subjecting a subject to split imaging, an image composition unit that composes the plurality of images based on correspondence points between images, an image arrangement decision unit that, in a case where the plurality of images are unable to be composed into one image, divides the plurality of images into composable image groups and decides an image arrangement based on correspondence points between images by image group, a display controller that makes a display device display the plurality of images in the decided image arrangement by image group, and a correspondence point designation unit that designates correspondence points for one image group among the displayed image groups and another image group among the image groups. The image composition unit composes the one image group and the other image group based on the designated correspondence points. According to the ninth aspect, as in the first aspect, it is possible to enable rapid and easy designation of correspondence points and image composition based on the designated correspondence points.

According to a tenth aspect, in the image composition device according to the ninth aspect, the image arrangement decision unit sets a reference image to be a reference of projective transformation among the plurality of images, calculates a projective transformation matrix of an image other than the reference image among the plurality of images with respect to the reference image based on the correspondence points between the images, and decides the image arrangement based on the calculated projective transformation matrix. According to the tenth aspect, as in the second aspect, an image other than the reference image is moved, rotated, or the like by the projective transformation matrix with respect to the reference image, and the image arrangement is decided.

According to an eleventh aspect, in the image composition device according to the ninth or tenth aspect, the image composition unit composes images by image group, and the display controller makes the plurality of images be displayed with an image composed by image group.

According to a twelfth aspect, in the image composition device according to the any one of the ninth to eleventh aspects, the image arrangement decision unit changes a relative arrangement between the image groups based on a user's instruction input, and the display controller makes the plurality of images be displayed in the changed relative arrangement. According to the twelfth aspect, as in the seventh aspect, it is possible to enable rapid and easy designation of correspondence points and image composition based on the designated correspondence points.

In order to achieve the above-described object, a thirteenth aspect provides a recording medium in which a computer-readable code of a program causing a computer to execute the image composition method according to any one of the first to eighth aspects is recorded. According to the thirteenth aspect, as in the first aspect, it is possible to enable rapid and easy designation of correspondence points and image composition based on the designated correspondence points. The recording medium according to the thirteenth aspect can be a non-transitory recording medium, such as various magneto-optical recording mediums or a semiconductor recording medium.

As described above, with the image composition method, the image composition device, and the recording medium of the invention, it is possible to enable rapid and easy designation of correspondence points and image composition based on the designated correspondence points.

BRIEF DESCRIPTION OF THE DRAWINGS

FIG. 12 is a flowchart showing image arrangement decision processing.

FIG. 14 is a diagram showing an example of image arrangement of each image group.

FIG. 23 is a diagram showing an example of damage information.

DESCRIPTION OF THE PREFERRED EMBODIMENTS

Hereinafter, an embodiment of an image composition method, an image composition device, and a recording medium according to the invention will be described in detail referring to the accompanying drawings.

<Structure of Bridge>

Figure 1:
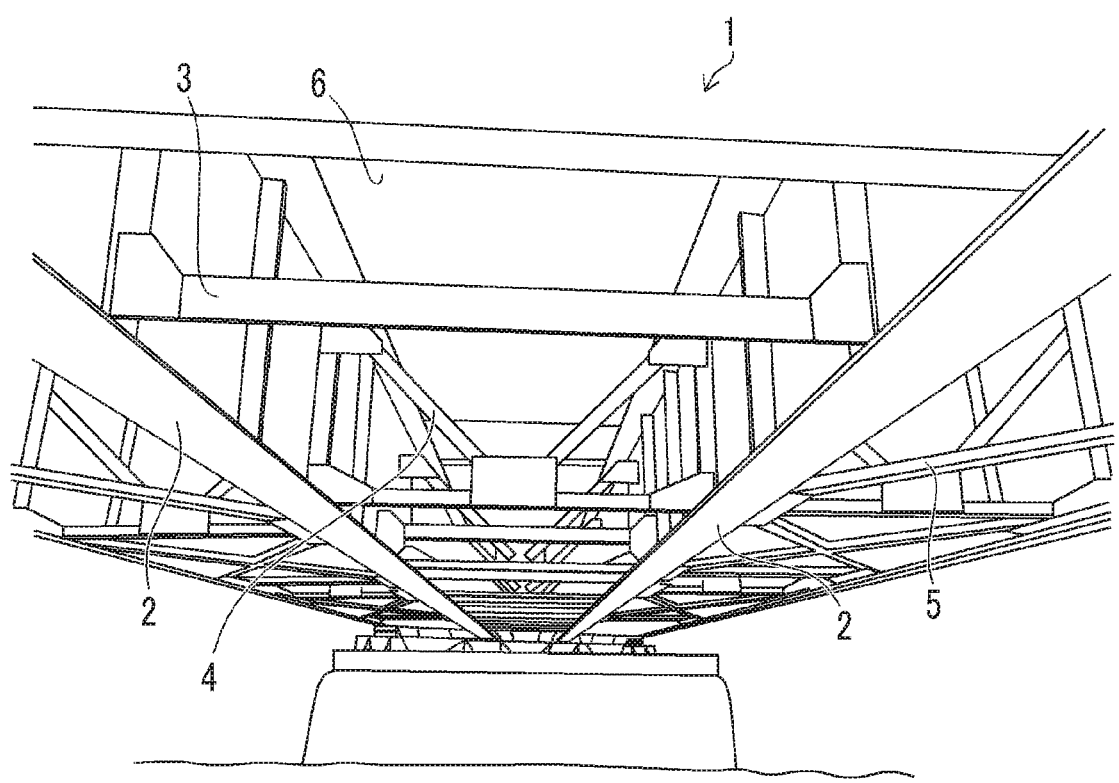
FIG. 1 is an appearance diagram of a bridge when viewed from a lower surface.

FIG. 1 is a perspective view showing a state in which a bridge 1 as one of structures is viewed from below. The bridge 1 shown in FIG. 1 has a stereoscopic structure of main girders 2, cross beams 3, cross frames 4, lateral frames 5, and deck slabs 6, and these members are connected by bolts, rivets, or welding. The deck slabs 6 on which vehicles and the like travel are installed on the main girders 2 or the like. The deck slabs 6 are generally made of reinforced concrete. The main girder 2 is a member that is laid between abutments or bridge piers and supports the load of vehicles and the like on the deck slab 6, and has a surface (a surface in a vertical direction) perpendicular to a surface (horizontal plane) of the deck slab 6. The cross beam 3 is a member that connects the main girders 2 to support a load by a plurality of main girders 2. The cross frame 4 and the lateral frame 5 are members that connect the main girders 2 to resist a lateral load of wind and earthquake, respectively. In the embodiment, although a case where the bridge 1 is a target (subject) has been described, a structure as a target is not limited to the bridge, and may be a tunnel, a building, a road, or the like.

<Acquisition of Images>

In a case where images of the bridge 1 are captured to generate a composite image, an inspector images the bridge 1 from below using a digital camera 100 (see FIG. 2), and splits and acquires a plurality of captured images (a plurality of images obtained by imaging different portions of the bridge 1) for an inspection range. Imaging is performed while suitably moving in an extension direction of the bridge 1 and a direction perpendicular to the extension direction. In a case where the inspector hardly moves due to surrounding circumstances of the bridge 1, the digital camera 100 may be provided in a moving object capable of moving along the bridge 1 to perform imaging. Such a moving object may be provided with an elevating mechanism and a rotating mechanism (a mechanism that performs pan and tilt) of the digital camera 100. Although a vehicle, a robot, and a flying object (a drone or the like) can be exemplified as an example of the moving object, the invention is not limited thereto.

<Configuration of Image Processing System>

Figure 2:
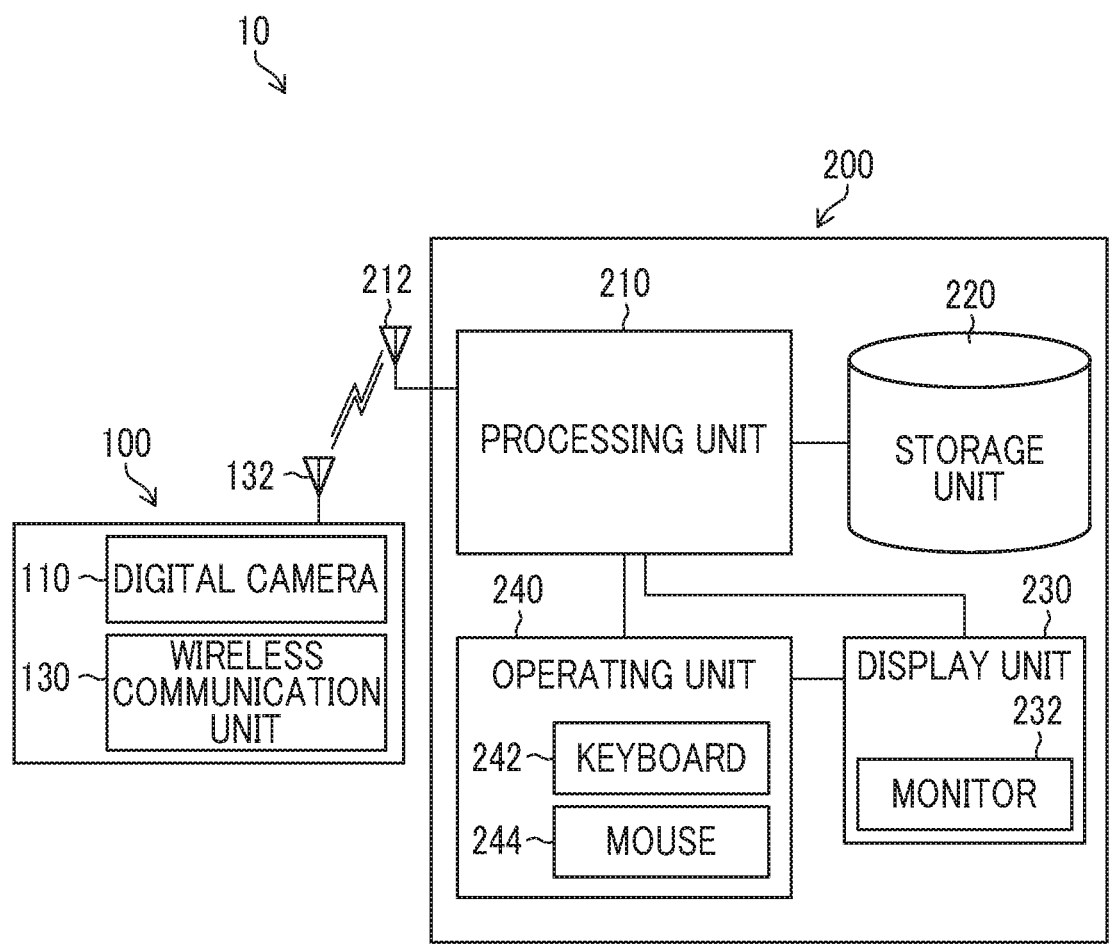
FIG. 2 is a block diagram showing the configuration of an image processing system.

FIG. 2 is a block diagram showing the schematic configuration of an image processing system 10. The image processing system 10 comprises the digital camera 100 ((imaging device) and a system body 200 (image composition device). The image processing system 10 is a system that performs composition or the like of a plurality of images acquired by subjecting the subject to split imaging (details will be described below), and can be applied to a digital camera, a smartphone, a tablet terminal, a personal computer, or the like. The digital camera 100 may be incorporated into a housing separate from the system body 200 or may be integrated with the system body 200. Alternatively, the digital camera 100 may be incorporated as a part of the system body 200, and the image composition device according to the invention may be constituted of the digital camera 100 and the system body 200.

<Configuration of Digital Camera>

The digital camera 100 acquires an image with an imaging optical system 110 comprising an imaging lens and an imaging element (not shown). As an example of the imaging element, a charge coupled device (CCD) type imaging element and a complementary metal-oxide semiconductor (CMOS) type imaging element can be exemplified. A color filter of red (R), G (green), or blue (B) is provided on a light receiving surface of the imaging element, and a color image of the subject can be acquired based on a signal of each color. The digital camera 100 performs wireless communication with the system body 200 through a wireless communication unit 130 and an antenna 132, and a captured image is input to a processing unit 210 and is subjected to processing described below.

<Configuration of System Body>

The system body 200 comprises the processing unit 210, a storage unit 220, a display unit 230, and an operating unit 240, and these units are connected to one another such that needed information is transmitted and received. The system body 200 performs wireless communication with the digital camera 100 through an antenna 212 and acquires captured images captured by the digital camera 100.

<Configuration of Processing Unit>

Figure 3:
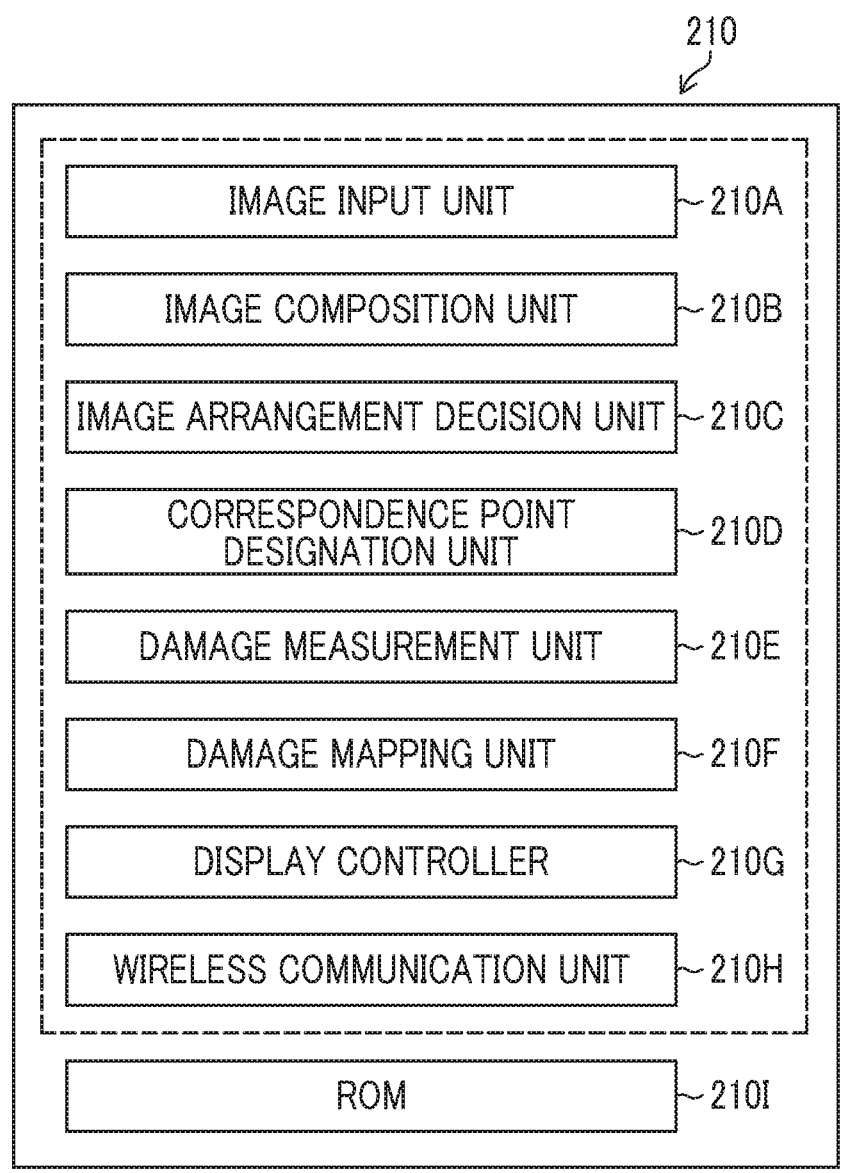
FIG. 3 is a diagram showing the functional configuration of a processing unit.

FIG. 3 is a diagram showing the configuration of the processing unit 210. The processing unit 210 comprises an image input unit 210A, an image composition unit 210B, an image arrangement decision unit 210C, a correspondence point designation unit 210D, a damage measurement unit 210E, a damage mapping unit 210F, a display controller 210G, and a wireless communication unit 210H, and performs composition or the like of images based on the captured images acquired by the digital camera 100. The image input unit 210A inputs the captured images (a plurality of images obtained by subjecting the bridge 1 to split imaging) of the bridge 1 from the digital camera 100 (or a recording medium, a network, or the like). The image composition unit 210B detects correspondence points between images and composes the captured images based on the correspondence points between the images. In a case where the captured images (a plurality of images) cannot be composed into one image, the image arrangement decision unit 210C divides a plurality of images into composable image groups and decides an image arrangement based on correspondence points between images by image group. The correspondence point designation unit 210D designates correspondence points for one image group among the displayed image groups and another image group among the image groups based on a user's instruction input. The damage measurement unit 210E extracts and measures damage (crack, peeling, corrosion, or the like) in a composite image. The damage mapping unit 210F maps information indicating damage to the composite image. The display controller 210G performs display control of the captured images, the composite image, and the like on the display unit 230 (monitor 232; display device). The wireless communication unit 210H transmits and receives images and information to and from the digital camera 100 through the antenna 212. In a read only memory 210I (ROM, non-transitory recording medium), computer-readable code of various programs for an operation of the image processing system 10, such as an image composition program for executing an image composition method according to the invention, are recorded.

Functions of the units of the processing unit 210 described above can be implemented using various processors. Various processors include, for example, a central processing unit (CPU) that is a general-purpose processor executing software (program) to implement various functions. Various processors described above also include a programmable logic device (PLD) that is a processor capable of changing a circuit configuration after manufacture, such as a field programmable gate array (FPGA). In addition, a dedicated electric circuit that is a processor having a circuit configuration dedicatedly designed for executing specific processing, such as an application specific integrated circuit (ASIC), and the like are also included in various processors described above.

The functions of the units may be implemented by one processor or may be implemented by combining a plurality of processors. A plurality of functions may be implemented by one processor. As an example where a plurality of functions are constituted of one processor, first, as represented by a computer, such as a client or a server, there is a form in which one processor is constituted of a combination of one or more CPUs and software, and the processor implements a plurality of functions. Secondly, as represented by system on chip (SoC) or the like, there is a form in which a processor that implements all functions of a system into one integrated circuit (IC) chip is used. In this way, various functions are constituted using one or more processors among various processors described above as a hardware structure. In addition, the hardware structure of various processors is, more specifically, an electric circuit (circuitry) in which circuit elements, such as semiconductor elements, are combined.

In a case where the above-described processor or the electric circuit executes software (program), a processor (computer) readable code of software to be executed (including a program for executing the image composition method according to the invention) is stored in a non-transitory recording medium, such as the ROM 210I (see FIG. 3), and the processor refers to software. The code may be recorded in a non-transitory recording medium, such as various magneto-optical recording devices or a semiconductor memory, instead of the ROM 210I. In processing using software, for example, a random access memory (RAM) is used as a temporary storage area, and data stored in, for example, an electronically erasable and programmable read only memory (EEPROM) is referred to. In FIG. 3, devices, such as the RAM and the EEPROM, are not shown.

<Configuration of Storage Unit>

Figure 4:
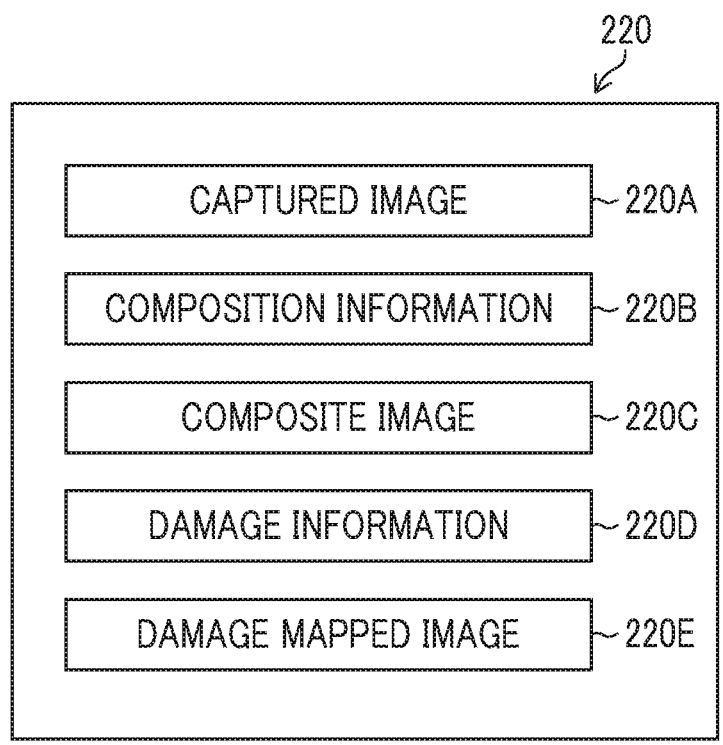
FIG. 4 is a diagram showing information that is stored in a storage unit.

The storage unit 220 is constituted of a non-transitory recording medium, such as a compact disk (CD), a digital versatile disk (DVD), a hard disk, or various semiconductor memories, and a controller thereof, and stores images and information shown in FIG. 4 in association with each other. The captured images 220A are a plurality of images obtained by subjecting the bridge 1 (the portion of the deck slab 6) as the subject to split imaging with the digital camera 100 and input with the image input unit 210A. Instead of the images input by the digital camera 100 and the image input unit 210A, images acquired by way of a network or a recording medium may be stored. Composition information 220B is information for composing the captured images, such as correspondence points and a projective transformation matrix. A composite image 220C is an image (including a partially composed image group) obtained by composing the captured images. Damage information 220D is information of damage extracted from the composite image. A damage mapped image 220E is an image obtained by mapping information indicating damage to the composite image. These images and information can be stored in a folder or a subfolder (see FIGS. 10 and 11).

<Configuration of Display Unit and Operating Unit>

The display unit 230 comprises the monitor 232 (display device), and can display the input images, the images and information stored in the storage unit 220, results of processing in the processing unit 210, and the like. The operating unit 240 includes a keyboard 242 and a mouse 244 as an input device and/or a pointing device, and the user can perform an operation needed for executing the image composition method according to the invention through these devices and a screen of the monitor 232 (this will be described below). The operation includes an operation (see FIGS. 10 and 11), such as creation of a folder and a subfolder described below and division of images into folders, designation of correspondence points, movement of displayed image groups, input of damage information, and the like.

<Procedure of Image Processing>

Figure 5:
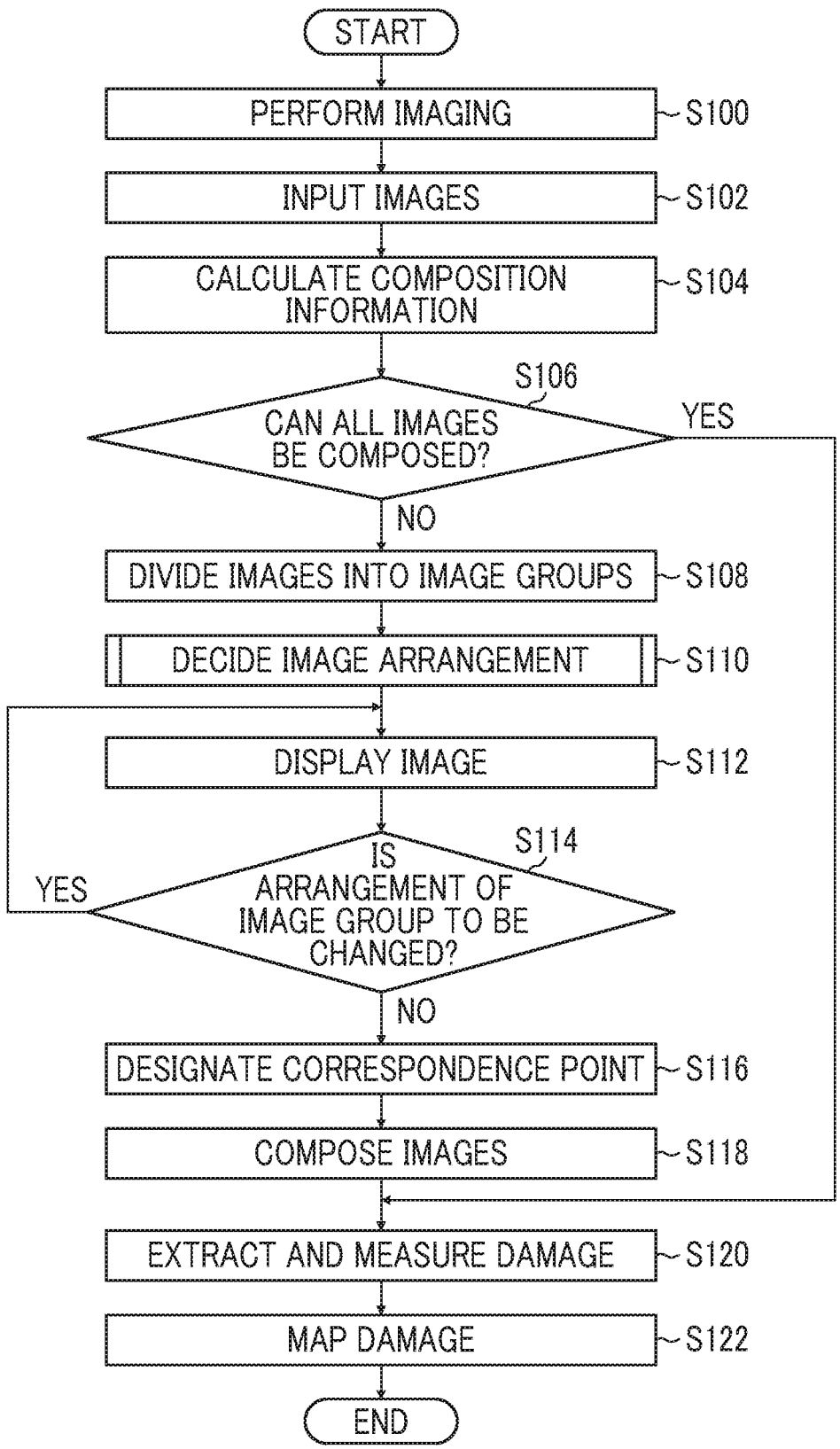
FIG. 5 is a flowchart of image processing according to a first embodiment.

Image processing in the image processing system 10 will be described. FIG. 5 is a flowchart showing a procedure of the image processing (including steps of the image composition method according to the invention).

<Imaging>

First, a plurality of captured images obtained by subjecting different portions of the bridge 1 (structure) to split imaging with the digital camera 100 are acquired (Step S100; image acquisition step). The system body 200 acquires a plurality of captured images through the digital camera 100 (the imaging optical system 110, the wireless communication unit 130, the antenna 132, and the antenna 212) and the processing unit 210 (the wireless communication unit 210H and the image input unit 210A).

Figure 6:
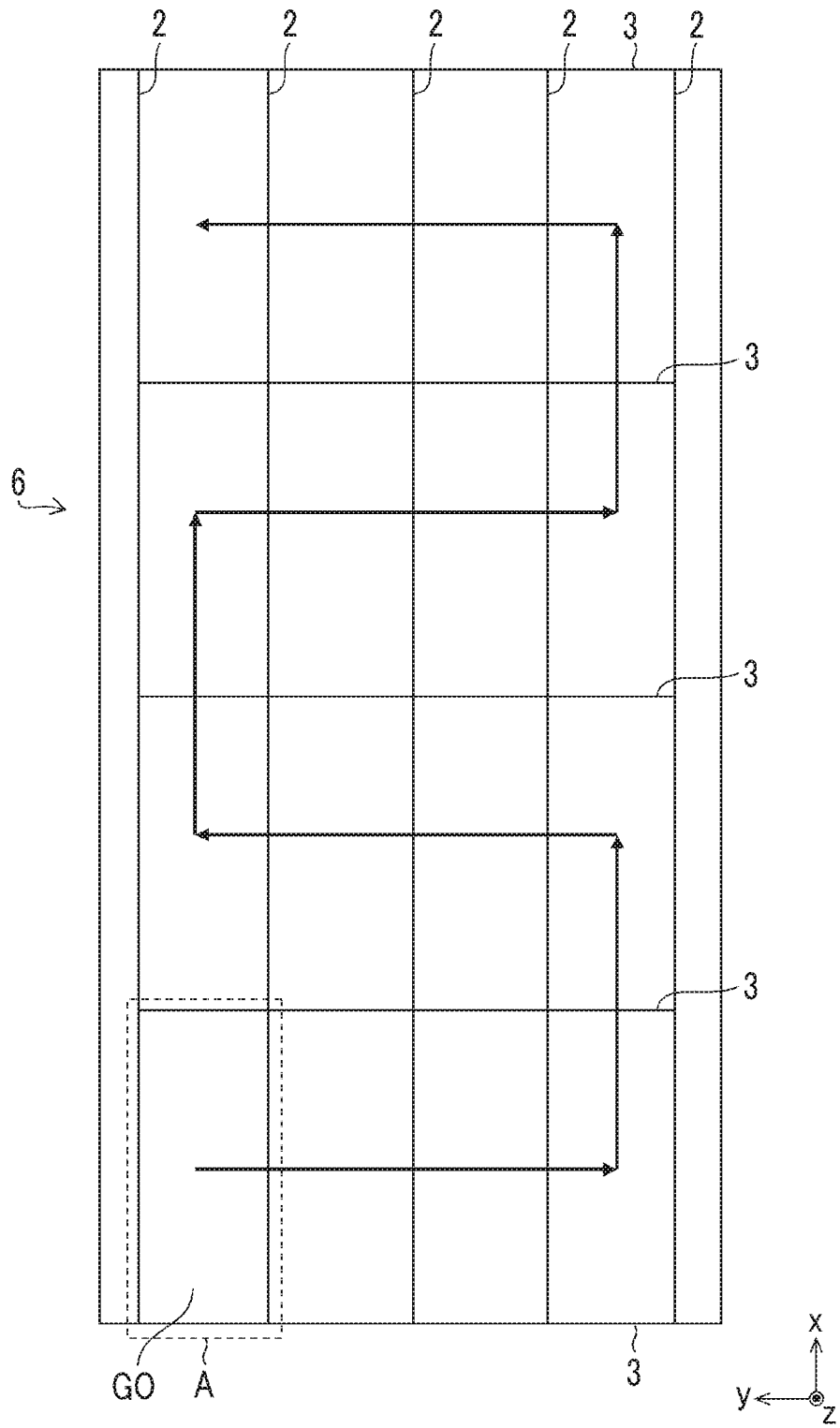
FIG. 6 is a diagram showing an example of an imaging procedure of a deck slab.

In the embodiment, a case where the deck slab 6 is imaged will be described. FIG. 6 is a diagram showing an example of an imaging procedure of the deck slab 6. FIG. 6 shows an aspect in which imaging is performed in units of an area A including a panel GO defined by the main girders 2 (members extending in an x direction) and the cross beams 3 (members extending in a y direction), and imaging is repeated while sequentially moving an imaging area in the y direction and the x direction (in directions of arrows). In a case where images of the entire imaging range can be acquired, imaging may be performed in other procedures. In FIG. 6, the extension direction of the bridge 1 (deck slab 6) is referred to as x, a direction perpendicular to x within the surface of the deck slab 6 is referred to as y, a direction (vertical downward direction) perpendicular to deck slab 6 is referred to as z, and coordinates in a right-hand system are constituted of (x,y,z).

Figure 7:
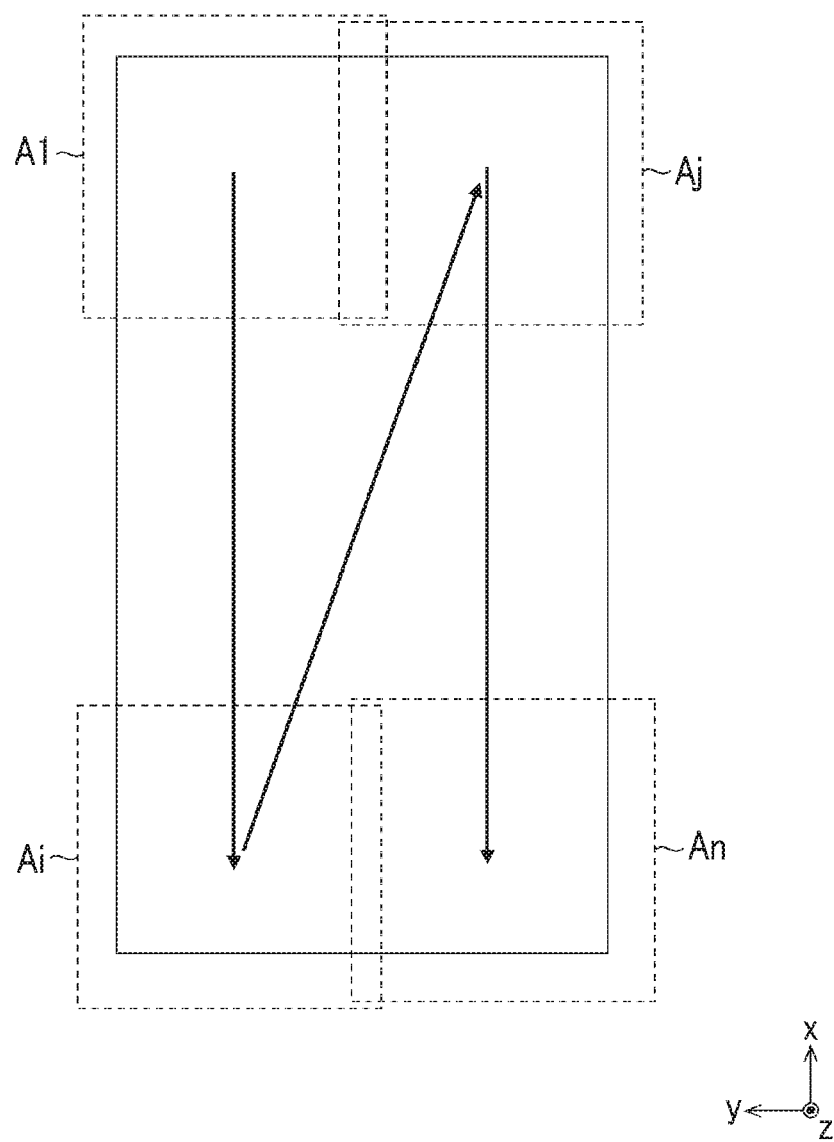
FIG. 7 is a diagram showing an example of an imaging procedure of a panel.

FIG. 7 is a diagram showing an example of an imaging procedure in one panel GO. In the example of FIG. 7, imaging is performed while the inspector or the moving object moves from an area A1 in a +x side end portion of the panel GO to an area Ai in an −x direction end portion, returns to the +x side end portion again, and moves from an area Aj to an area An in the −x direction end portion, thereby capturing n (where n is an integer equal to or greater than two) images in total. Imaging may be performed in a pattern (for example, in an order of areas A1 to Ai and An to Aj) different from the above-described pattern. In imaging, an imaging position may be moved and a confronting image may be continuously captured each time one image is captured, or a plurality of images may be captured while changing an imaging direction at one imaging position (in this case, an image captured in an inclined direction is included). Furthermore, in imaging, it is preferable that the imaging position and the imaging direction are appropriately set to cause a sufficient (for example, about 30%) overlap between adjacent images, and the correspondence points are detected and set ease and with high accuracy.

Figure 8:
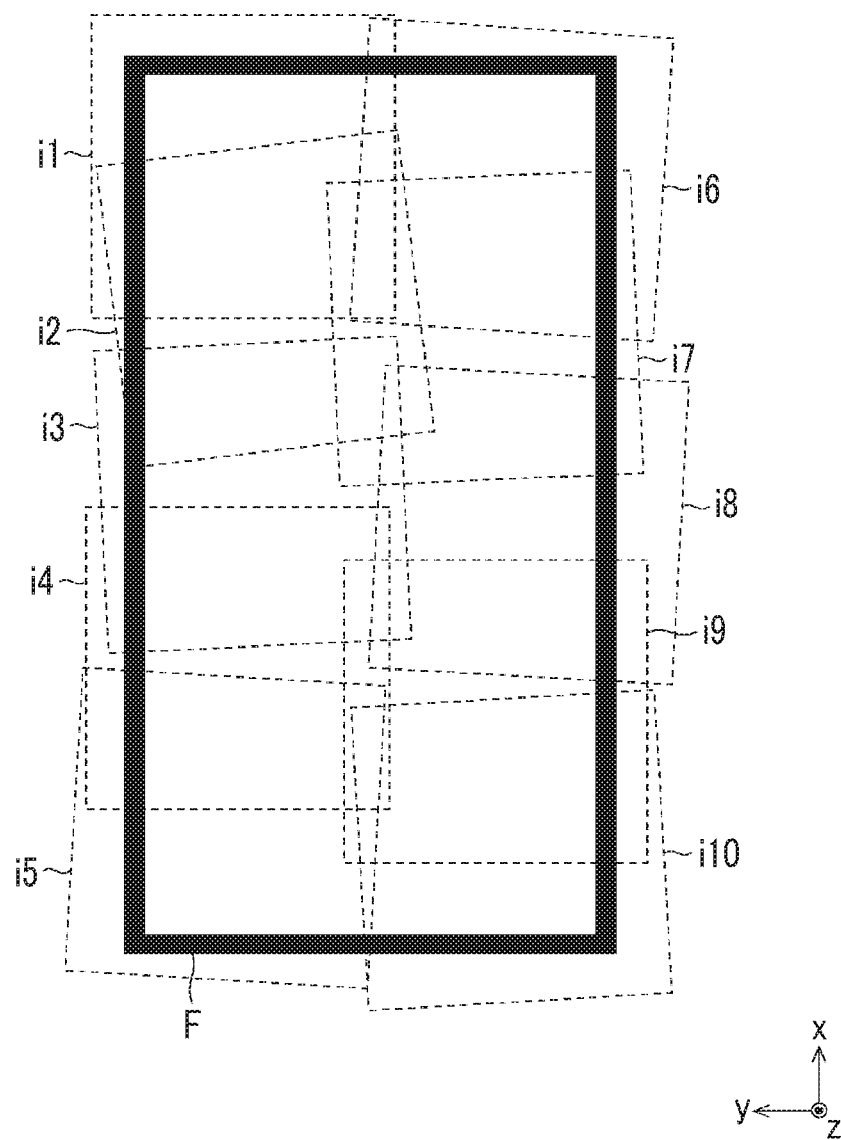
FIG. 8 is a diagram showing an imaging range of each image.
Figure 9:
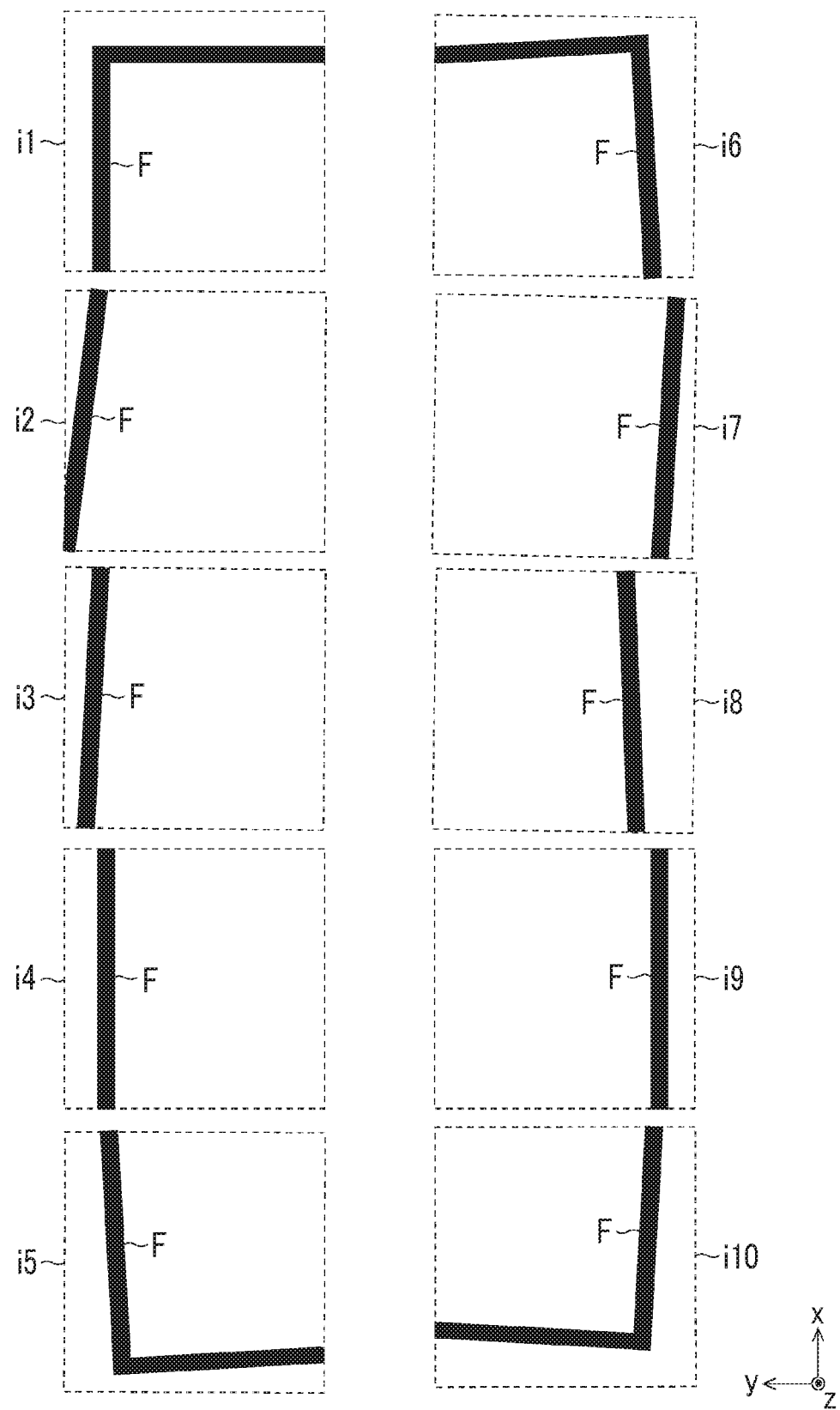
FIG. 9 is a diagram showing each captured image.

FIG. 8 shows an example of captured images, and shows an aspect in which ten images of images i1 to i10 are captured while securing an overlap. FIG. 9 is a diagram showing the images i1 to i10 individually. In FIGS. 8 and 9, a frame F (a rectangular shape defined by the main girders 2 and the cross beams 3) of the panel GO is shown, and damage that occurs in other members and the deck slabs is omitted (unless specially described, the same applies to subsequent drawings).

<Storage of Images and Information>

Figure 10:
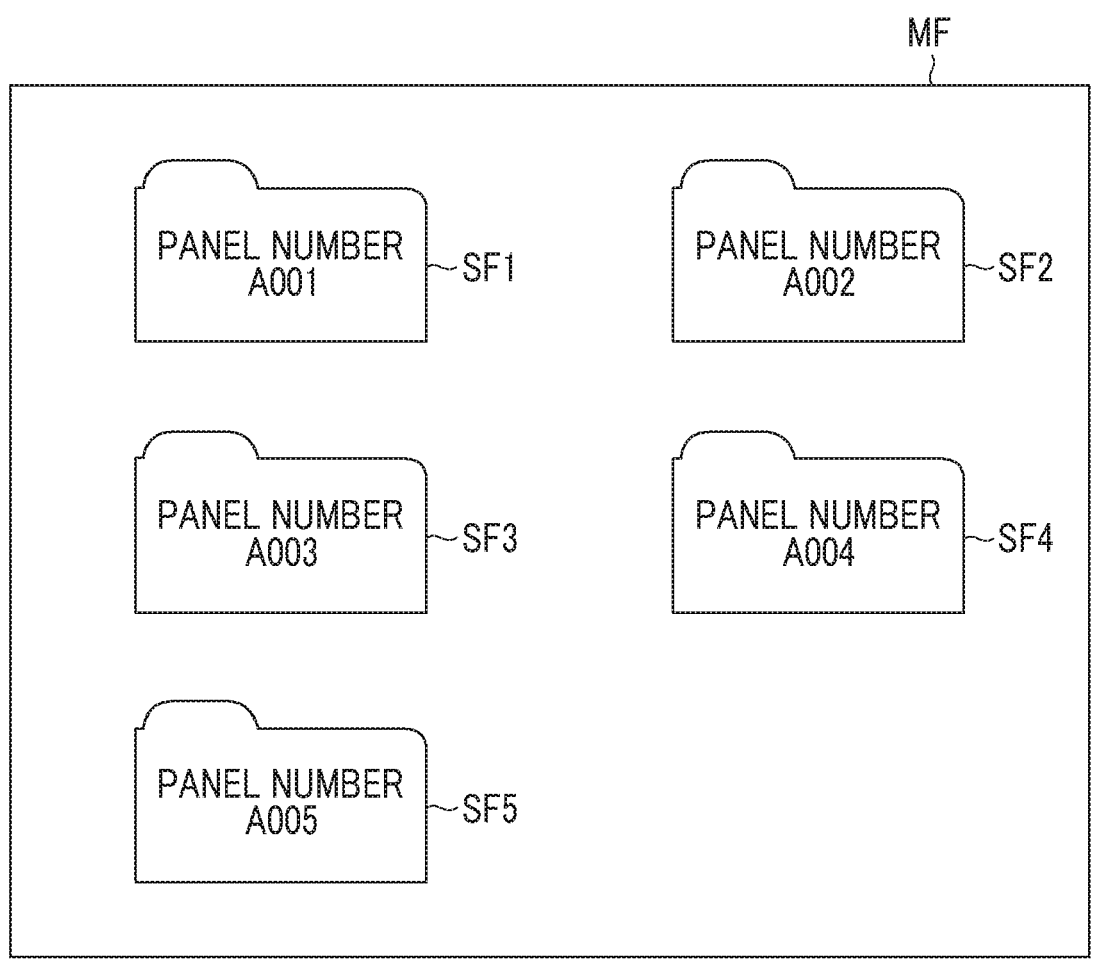
FIG. 10 is a diagram showing an aspect in which captured images and the like are divided into folders by member and stored.

FIG. 10 is a diagram showing an aspect of storage of images. In the image processing system 10, a main folder can be created for the entire imaging range, and subfolders can be created in the main folder. A subfolder can be created, for example, by member number or by panel GO defined by the main girders 2 and the cross beams 3. In FIG. 10, although an aspect in which subfolders SF1 to SF5 are created in a main folder MF is shown, the number of main folders and the number of subfolders are not particularly limited. Subfolders (for example, a plurality of subfolders corresponding to different creation date and time) may be further created in a subfolder.

In the storage of the captured images, the main folder and the subfolders can be created on the digital camera 100 side, and the captured image stored in these folders can be input to the system body 200 side by folder (Step S102 of FIG. 5). Alternatively, the images sequentially input (Step S102) from the digital camera 100 to the system body 200 may be divided into the folders according to an operation on the operating unit 240 (the keyboard 242 or the mouse 244). The input of the images may be performed under the control of the processing unit 210 (the image input unit 210A). Any method may be used as long as the main folder and the subfolders are finally created in the system body 200 (the storage unit 220) and the images are stored in the main folder and the subfolders. The creation of the main folder and the subfolders and the division of the images into the folders can be easily implemented by a user's operation using a file management tool in the system body 200 (the operating unit 240) (may be the same as a file management tool in a general personal computer).

Figure 11:
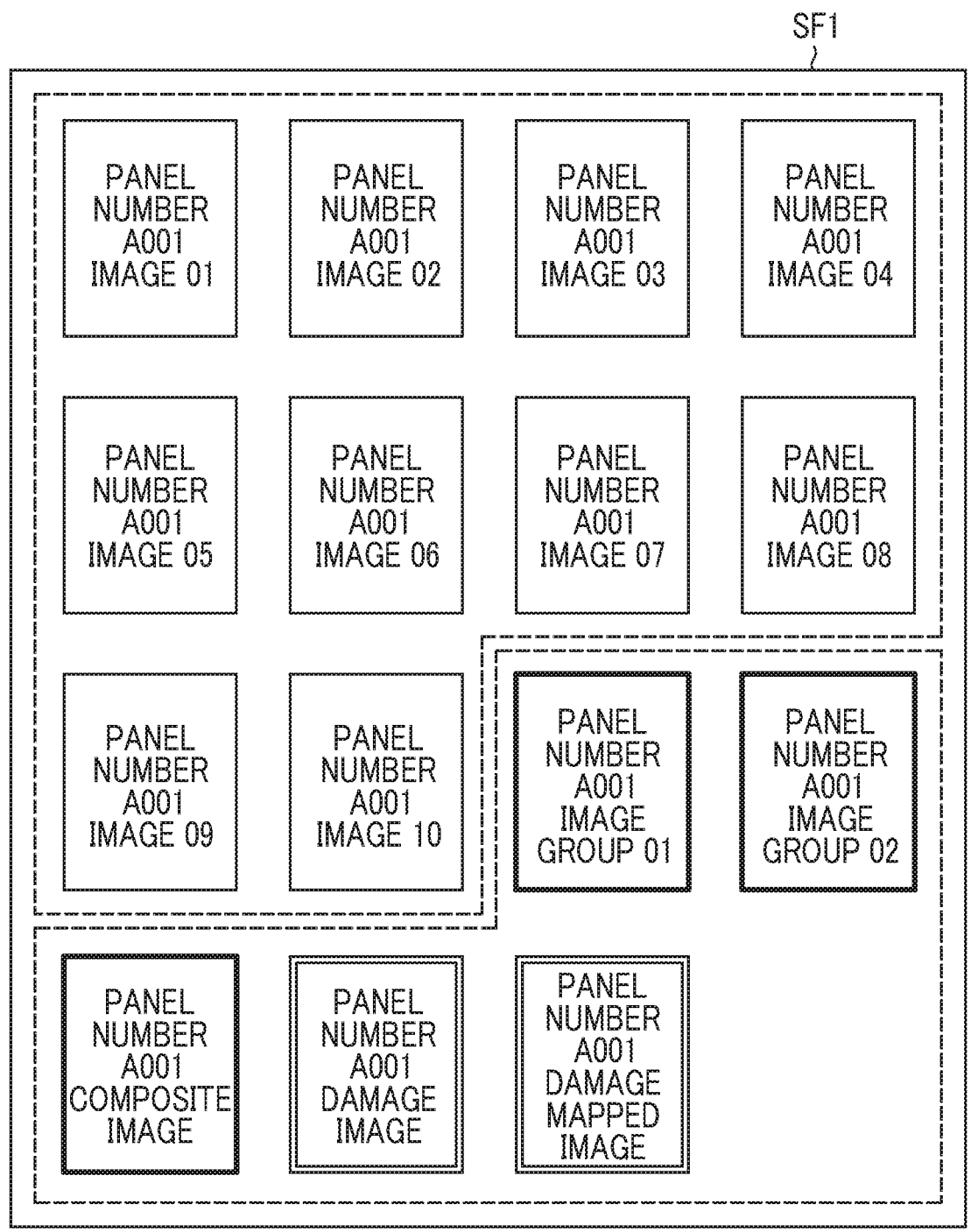
FIG. 11 is another diagram showing an aspect in which captured images and the like are divided into folders by member and stored.

FIG. 11 is a diagram showing images and information stored in a subfolder SF1. In the subfolder SF1, the image groups (for example, image groups G1 and G2 described below) and processing results, such as a composite image (for example, an image G3 or G3a described below), damage information (see FIG. 23), and a damage mapped image (see FIG. 22), corresponding to these captured images are stored in addition to the captured images (for example, the images i1 to i10 described above). That is, the captured images and the processing results corresponding to the captured images are stored in the same folder. In FIG. 11, a file surrounded by a dotted line indicates a captured image, and a file surrounded by a one-dot-chain line indicates a processing result.

<Calculation of Composition Information>

After the imaging and the input of the images are performed in Steps S100 and S102, the processing unit 210 (the image composition unit 210B) calculates composition information (the composition information 220B) (Step S104). As the composition information, for example, the correspondence points between the captured images and the calculated projective transformation matrix calculated based on the correspondence points, and the like can be calculated.

<Determination of Permission and Prohibition of Composition>

The processing unit 210 (the image composition unit 210B) determines whether or not all captured image can be composed into one image based on the composition information calculated in Step S104 (Step S106). Determination of composability can be performed based on the number of correspondence points, whether or not the reliability of the correspondence point is sufficient (whether or not the correspondence points are feature points), whether or not the projective transformation matrix can be calculated based on the correspondence points, or the like. In this case, the calculation of the projective transformation matrix and an evaluation value thereof may be repeatedly determined while changing a combination of correspondence points with a random sample consensus (RANSAC) algorithm or the like. In a case where all images can be composed into one image, the processing of Steps S108 to S118 is omitted, and the process progresses to Step S120 and extraction of damage is performed for the composite image. In a case where all images cannot be composed into one image, the processing of Steps S108 to S118 is executed (see the following description).

<Classification of Images>

In a case where determination is made in Step S106 that all captured images cannot be composed into one image", the image composition unit 210B divides the captured images into composable image groups (Step S108), and the image arrangement decision unit 210C decides an image arrangement based on correspondence points between images by image group (Step S110).

<Decision of Image Arrangement>

Figure 13A:
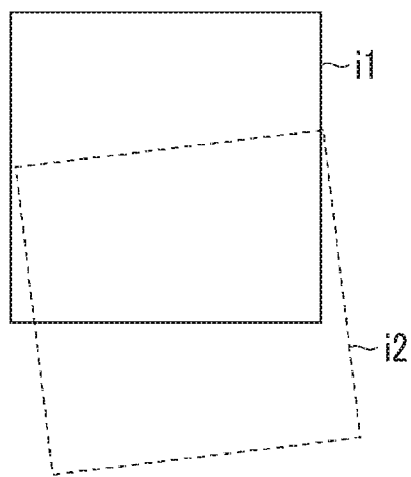
FIGS. 13A and 13B are diagrams showing an aspect of setting a reference image.

FIG. 12 is a flowchart showing details of image arrangement decision processing in Step S110 of FIG. 5. The image arrangement decision unit 210C sets a reference image to be a reference of projective transformation from among a plurality of captured images (Step S110A). Although the reference image can be set (selected) according to a feature of an image, such as the degree of confronting or sharpness, an image in a specific imaging order (for example, an initially captured image) may be set as a reference image. In the examples of FIGS. 8 and 9, as shown in FIG. 13A, the image i1 can be set as a reference image for the images i1 and i2.

Figure 13B:
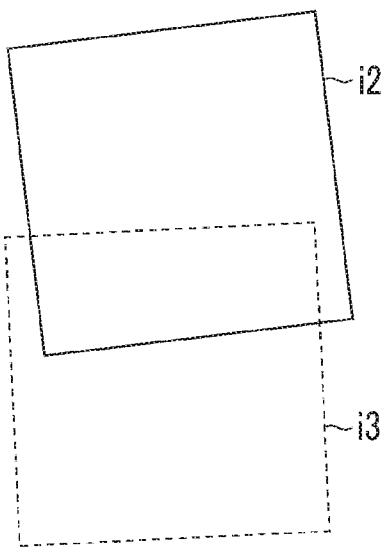

After the reference image is set, the image arrangement decision unit 210C calculates a projective transformation matrix of an image other than the reference image with respect to the reference image based on the correspondence points between the images (Step S110B). In the examples of FIGS. 8 and 9, as shown in FIG. 13A, the image i2 (an image other than the reference image) is projected on the same plane as the image i1 (the reference image), and the projective transformation matrix for making the correspondence points coincide with each other is calculated. After the projective transformation matrix of the image i2 with respect to the image i1 (the reference image) is calculated, as shown in FIG. 13B, the image i2 is set as the reference image, and the projective transformation matrix of the image i3 with respect to the image i2 is calculated. In this way, the projective transformation matrix is calculated for all images of the image group while changing the reference image (until the determination in Step S110C is YES). After the projective transformation matrix is calculated for all images, the image arrangement decision unit 210C moves, rotates, magnifies, reduce, modifies, or the like each image based on the calculated projective transformation matrix and decides an arrangement of each image of the image group (Step S110D). Hereinafter, description will be provided assuming that the images i1 to i4 and the images i6 to i9 constitute a composable image group G1, and the image i5 and the image i10 constitute a composable image group G2. In deciding the above-described image arrangement, although each image is moved, rotated, modified, or the like based on the projective transformation matrix, the example shown in the drawing conceptually shows the image arrangement or the like, but does not accurately represent the movement, rotation, modification, or the like of the image.

Figure 15:
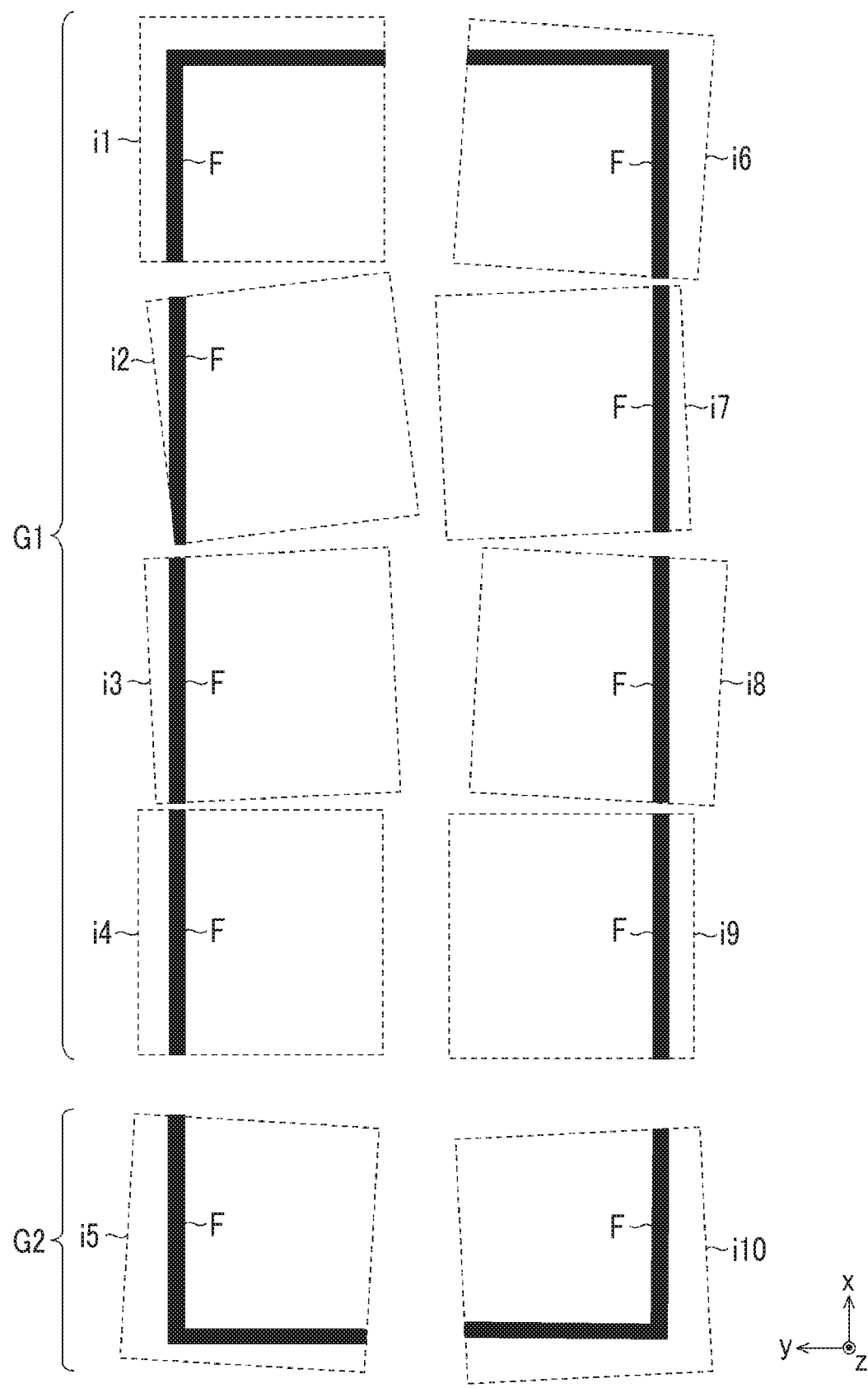
FIG. 15 is another diagram showing an example of image arrangement of each image group.

The image arrangement decided in Step S110D may be an image arrangement (see FIG. 14) in which overlapping areas between the images overlap each other or may be an image arrangement (see FIG. 15) in which the images do not overlap each other. In a case of the image arrangement in which the images do not overlap each other, as shown in FIG. 15, an arrangement in which the images are arranged at intervals in the x direction and the y direction, and a direction of each image is not changed to a direction obtained based on the projective transformation matrix (each image is not rotated) can be made.

<Image Display>

In a case where the image arrangement is decided in Step S110 (Steps S110A to S110D), the processing unit 210 (the image arrangement decision unit 210C and the display controller 210G) makes the monitor 232 (display device) display the composable image groups by image group (Step S112). In the above-described example, the image groups G1 and G2 are displayed in the image arrangement shown in FIG. 14 or 15. In this case, the processing unit 210 (the image arrangement decision unit 210C and the display controller 210G) executes processing for surrounding each of the image groups G1 and G2 by a frame, displaying the image groups in different colors, displaying the number of each image group, or the like such that the image groups can be easily identified. The image groups G1 and G2 may be composed by image group and images composed by image group may be displayed.

Figure 16:
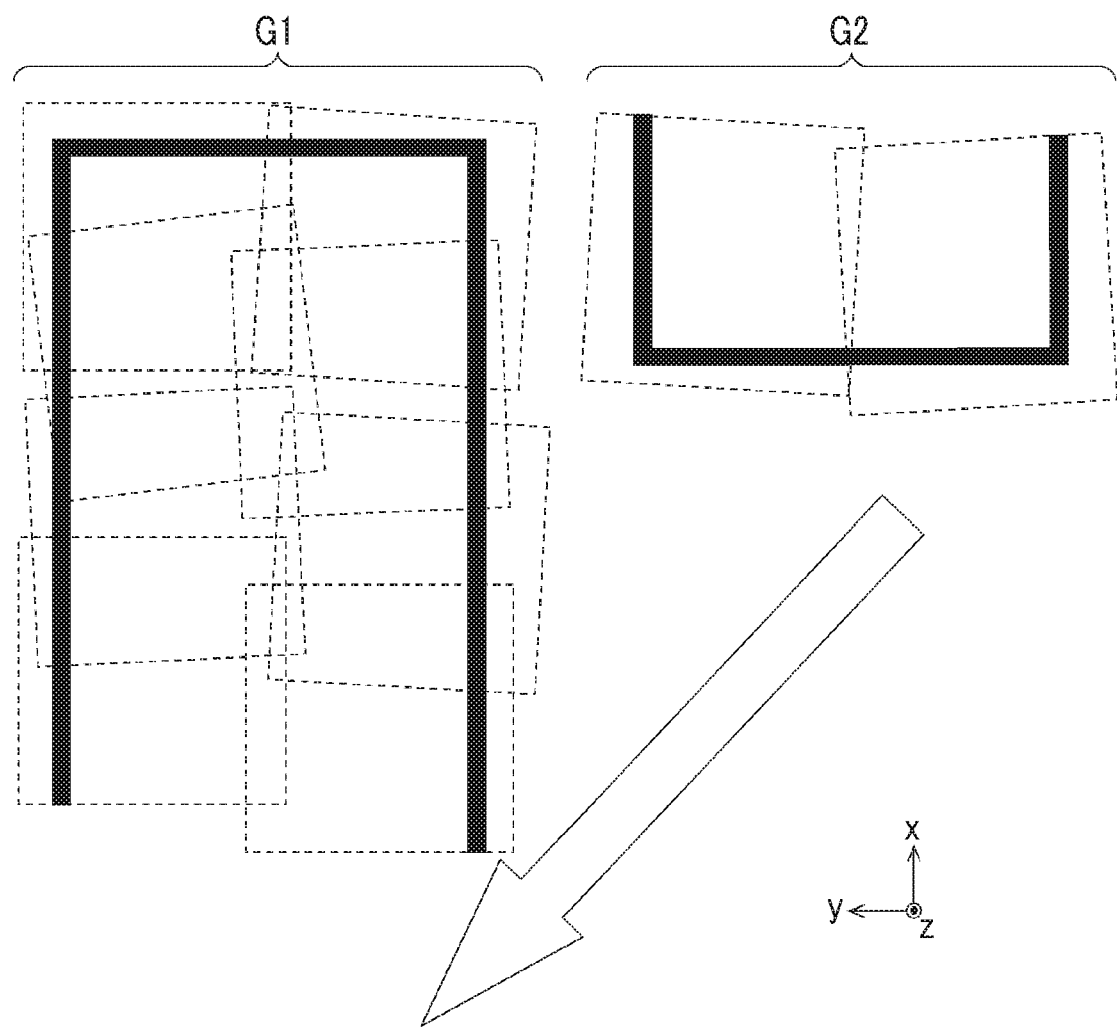
FIG. 16 is still another diagram showing an aspect of changing relative arrangement of each image group.

In the display in Step S112, the arrangement between the image groups may be inappropriate. For example, as shown in FIG. 16, the image group G2 that should be arranged below the image group G1 (-x direction) may be arranged in a lateral direction of the image group G1. Accordingly, the processing unit 210 (the image arrangement decision unit 210C) determines whether or not to change the arrangement of the image groups (Step S114), in a case where determination is made to change the arrangement (in Step S114, YES), the process returns to Step S112, and the display controller 210G displays the image groups G1 and G2 in an arrangement after change. The determination in Step S114 can be performed based on a user's instruction input (for example, an operation to move the image group G2, that is, to change a relative arrangement of the image group G2 through the keyboard 242 and/or the mouse 244). In the example of FIG. 16, the image arrangement decision unit 210C and the display controller 210G can move the image group G2 below the image group G1 (in FIG. 16, the moving direction is indicated by an arrow) based on a user's operation (for example, a drag operation with the mouse 244) and can display the image groups G1 and G2 as in FIG. 14.

Although a lot of time may be needed for the designation of the correspondence points in a case where the display is performed in a state in which the relative arrangement between the image groups is inappropriate, in the image processing system 10, it is possible to enable rapid and easy designation of the correspondence points by changing such an arrangement.

<Designation of Correspondence Points>

Figure 17:
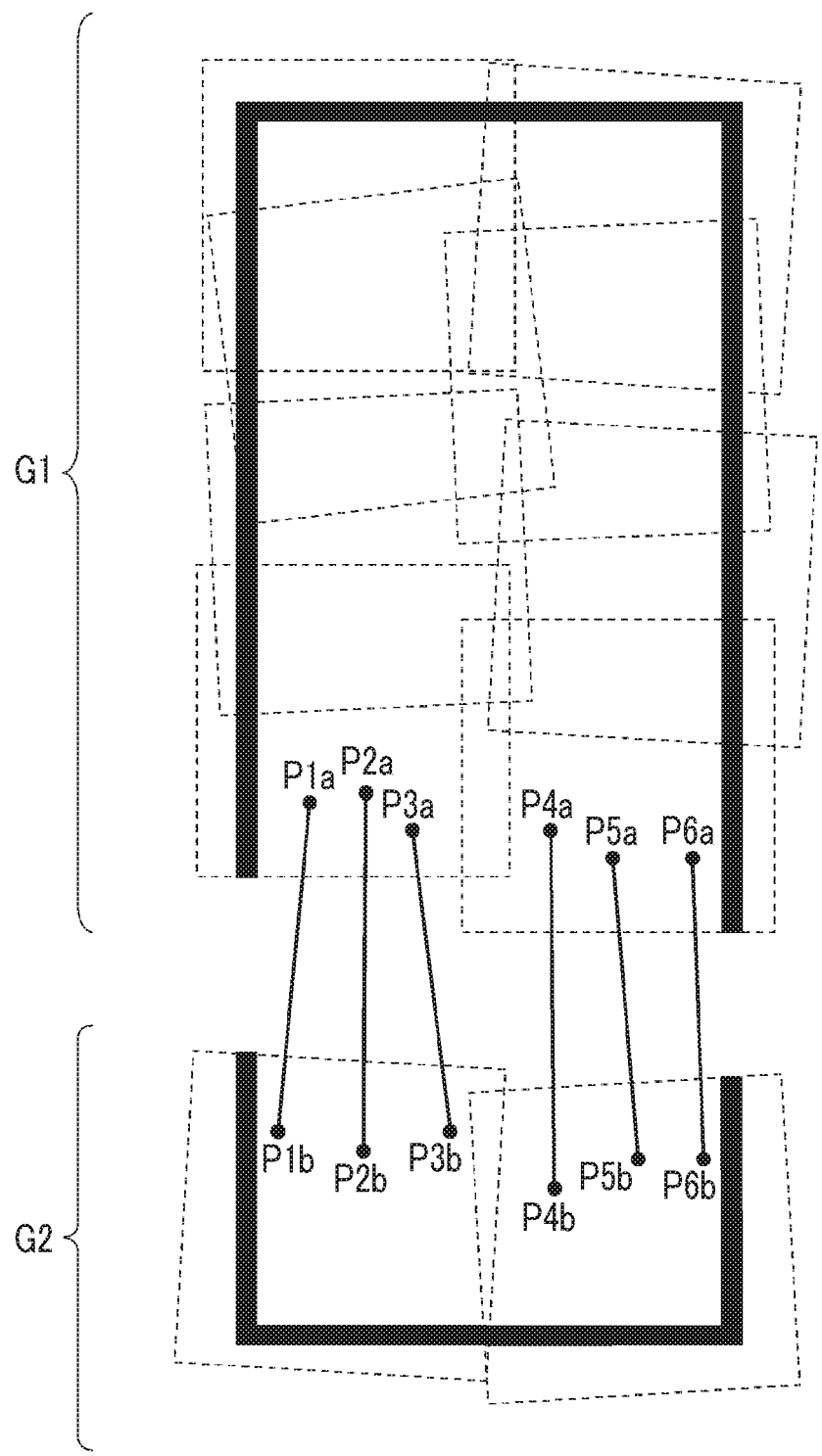
FIG. 17 is a diagram showing an aspect of setting correspondence points in image groups.

In a case where the arrangement of the image groups is decided through the processing to Step S114, the processing unit 210 (the correspondence point designation unit 210D) designates correspondence points for one image group and another image group among the displayed image groups (Step S116). For example, in a case where the image groups G1 and G2 are arranged and displayed as in FIG. 14, as shown in FIG. 17, a point P1$a$ is designated according to a click or the like (user's operation) of the mouse 244 in the image group G1, and a point P1$b$ as a correspondence point of the point P1$a$ is designated in the image group G2. In this case, as shown in FIG. 17, the correspondence point designation unit 210D and the display controller 210G perform association and identification by connecting the designated points P1$a$ and P1$b$ by a straight line or the like, whereby it is possible to allow easy ascertainment of the correspondence of the designated points. Hereinafter, similarly, correspondence points are designated for a point P2$a$ and a point P2$b$, a point P3$a$ and a point P3$b$, a point P4$a$ and a point P4$b$, a point P5$a$ and a point P5$b$, and a point P6$a$ and a point P6$b$. Although FIG. 17 shows an example where the six correspondence points are designated for each of the image groups G1 and G2 has been described, the number of correspondence points to be designated is not particularly limited. Even in a case where the image groups G1 and G2 are arranged and displayed as in FIG. 15, similarly, the correspondence points can be designated between the images i4 and i5 and between the images i9 and i10.

In a case where the image groups cannot be composed with high accuracy or cannot be composed based on the correspondence points designated as described above, the processing unit 210 (the image composition unit 210B, the correspondence point designation unit 210D, and the display controller 210G) may display a warning message on the monitor 232 to request the user to designate the correspondence points again.

<Image Composition>

After the correspondence points are designated in Step S116, the processing unit 210 (the image composition unit 210B and the image arrangement decision unit 210C) composes the image groups based on the designated correspondence points (Step S118). In the example of FIG. 17, the image composition unit 210B and the image arrangement decision unit 210C calculates a projective transformation matrix of the image group G2 based on the image group G1 (or a projective transformation matrix of the image group G1 based on the image group G2) based on the points P1a to P6b as the correspondence points. In addition, the arrangement of the images is decided by moving, rotating, modifying, or the like the images (the images i5 and i10) constituting the image group G2 based on the calculated projective transformation matrixes, and the images are composed in the decided arrangement. In a case where the projective transformation matrix cannot be calculated based on the designated correspondence points, in a case where calculation accuracy is bad, or the like, a warning message may be displayed, and the correspondence points may be designated again based on a user's operation to recalculate the projective transformation matrix.

Figure 18:
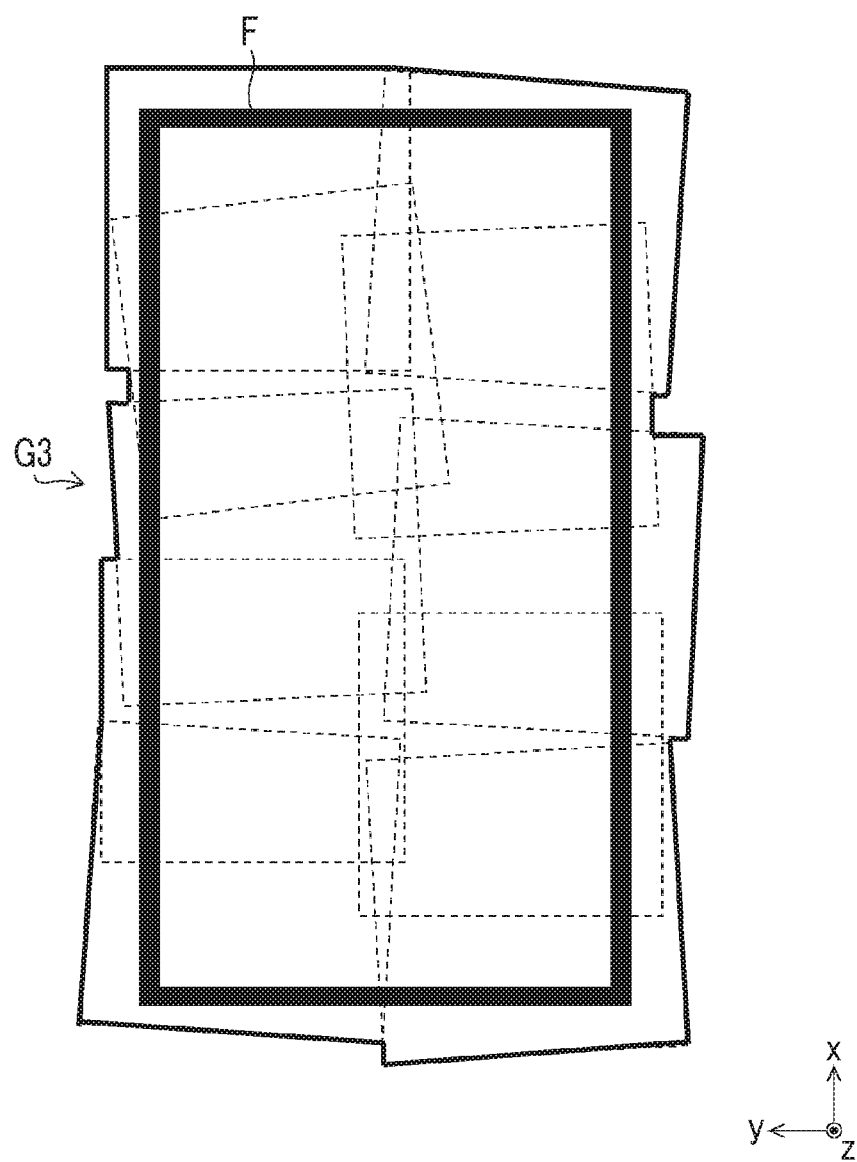
FIG. 18 is a diagram showing a composed image.

An aspect in which the image groups G1 and G2 are composed into one image is shown in FIG. 18. In FIG. 18, an image G3 (the contour of which is indicated by a solid line) after composition and the above-described frame F are shown. A dotted line in the drawing is a line indicating each image before composition. In this way, in the image processing system 10 according to the embodiment, since the composable image groups (the image groups G1 and G2) are displayed by image group, it is possible to allow easy ascertainment of an image group that cannot be (automatically) composed. It should suffice that the correspondence points may be designated for the image groups (the image group G1 and the image group G2) that cannot be composed; thus, there is no need to designate the correspondence points for all images, and it is possible to enable rapid and easy designation of the correspondence points and image composition based on the designated correspondence points.

<Selection of Image in Overlapping Area>

Figure 19A:
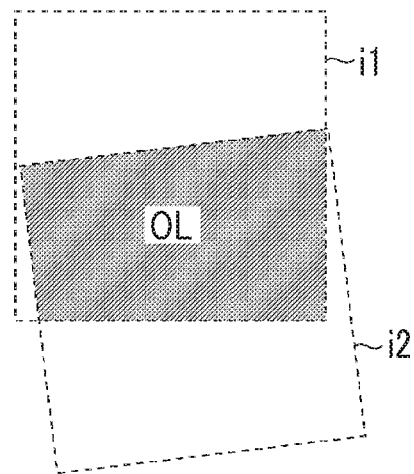
FIGS. 19A and 19B are diagrams showing composition of images in an area where images overlap each other.
Figure 19B:
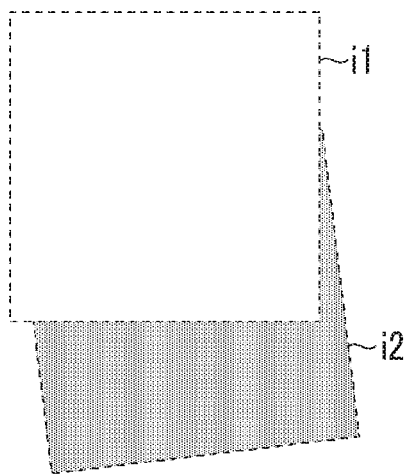
Figure 20:
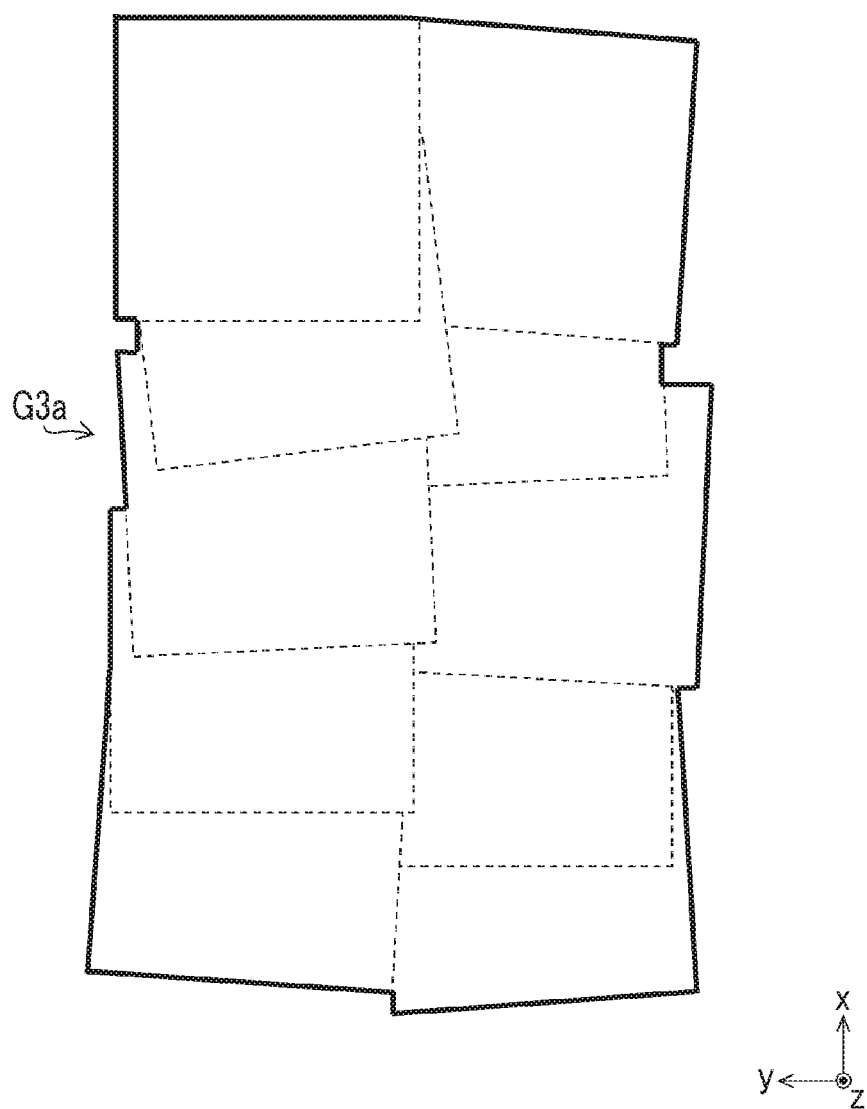
FIG. 20 is a diagram showing an example of an image composed taking into consideration overlapping.

In an example of FIG. 18, there is an area where a plurality of original images overlap one another in the composed image G3. In a case where a measurement target of damage or the like is present in such an area, a phenomenon that damage is blurred, a width is thickened, or the like occurs due to misregistration at the time of composition, and accuracy of detection and/or measurement may be degraded. Accordingly, in the image processing system 10, in image composition, it is possible to select and compose one image in an area where images overlap each other. An example of such image composition is shown in FIGS. 19 and 20. FIG. 19A shows an aspect in which the image i1 and the image i2 overlap in an area OL. The processing unit 210 (the image composition unit 210B) selects one of the images i1 and i2 in the area OL. For example, as in FIG. 19B, the image i1 is selected and composed for the area OL (a shaded portion indicates an area where the image i2 is selected). Such image selection may be performed by the processing unit 210 (the image composition unit 210B), for example, based on a feature, such as image brightness, the sharpness of the subject, or the like, or an image may be selected according to a user's operation through the operating unit 240.

An image G3a obtained by composing all images (images i1 to i10) in the same manner as in FIGS. 19A and 19B is shown in FIG. 20 (a dotted line in the drawing indicates the boundary of each image before composition). In FIG. 20, the frame F is not shown in order to clarify the area of each image. In this way, one image is selected and composed in an area where images overlap, whereby it is possible to reduce blurriness of a measurement target (damage or the like) and satisfactorily perform detection and measurement.

<Confronting Correction after Image Composition>

Figure 21:
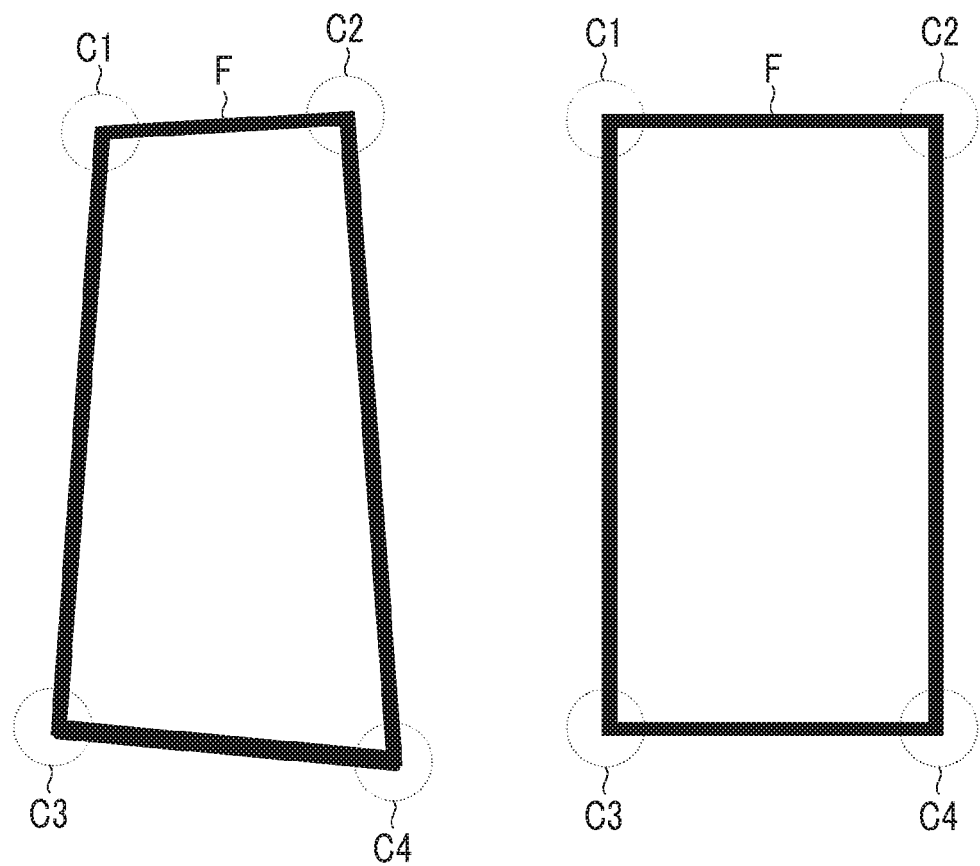
FIGS. 21A and 21B are diagrams showing an aspect of confronting correction after composition.

In the image processing system 10, although the projective transformation matrix of another image with respect to the reference image is calculated to decide the image arrangement as described above, in a case where the reference image is not in a confronting state in an imaging direction, an area that should be intrinsically in a rectangular shape in an image after composition may not be in a rectangular shape. For example, as shown in FIG. 21A, the frame F of the panel in the image after composition may be in a trapezoidal shape. In this case, the processing unit 210 (the image composition unit 210B and the image arrangement decision unit 210C) designates points (for example, points C1, C2, C3, and C4 of four corners of the frame F) forming a rectangular shape based on a user's operation through the keyboard 242 and/or the mouse 244 and forms a rectangular shape with the four points through projective transformation as shown in FIG. 21B. With this, it is possible to obtain an image (confronting image), in which the subject is in a confronting state, even after image composition.

<Extraction and Measurement of Damage>

In a case where the composite image is obtained through the processing to Step S118, the processing unit 210 (the damage measurement unit 210E) performs extraction and measurement of damage for the composite image (Step S120). Although peeling, water leakage, crack, rust, or the like can be exemplified as a classification of damage, the type of damage to be specifically extracted may be set according to the conditions of the type, feature, purpose of inspection, and the like of the structure (subject). Although examples of items to be measured include a position, a size, a direction, a range, a shape, and the like, measurement items may also be set according to the classification of damage or according to the conditions of the type, feature, purpose of inspection, and the like of the structure (subject).

Although extraction and measurement of damage can be performed by various methods according to the classification, in regard to crack, for example, a crack detection method described in JP4006007B can be used. The method is a crack detection method having a step of creating a wavelet image and a step of determining a crack area based on the wavelet image. In the step of creating the wavelet image, wavelet coefficients corresponding to two comparative concentrations are calculated, wavelet coefficients in a case where the two concentrations are changed are calculated to create a wavelet coefficient table, and an input image obtained by imaging a concrete surface as a crack detection target is subjected to wavelet transformation. In the step of determining the crack area, in the wavelet coefficient table, wavelet coefficients corresponding to an average concentration of neighboring pixels in a local area and a concentration of a pixel of interest are set as threshold values, and a crack area and an area with no crack are determined by comparing the wavelet coefficient of the pixel of interest with the threshold values.

As a method of detecting rust and peeling, for example, a processing method for a coating inspection system of a steel bridge described in JP2010-538258A can be used. In the processing method, rust and peeling are detected using color information from a captured image file of a steel bridge coating, video processing, water shade, and Parzen window.

<Mapping of Measurement Result>

Figure 22:
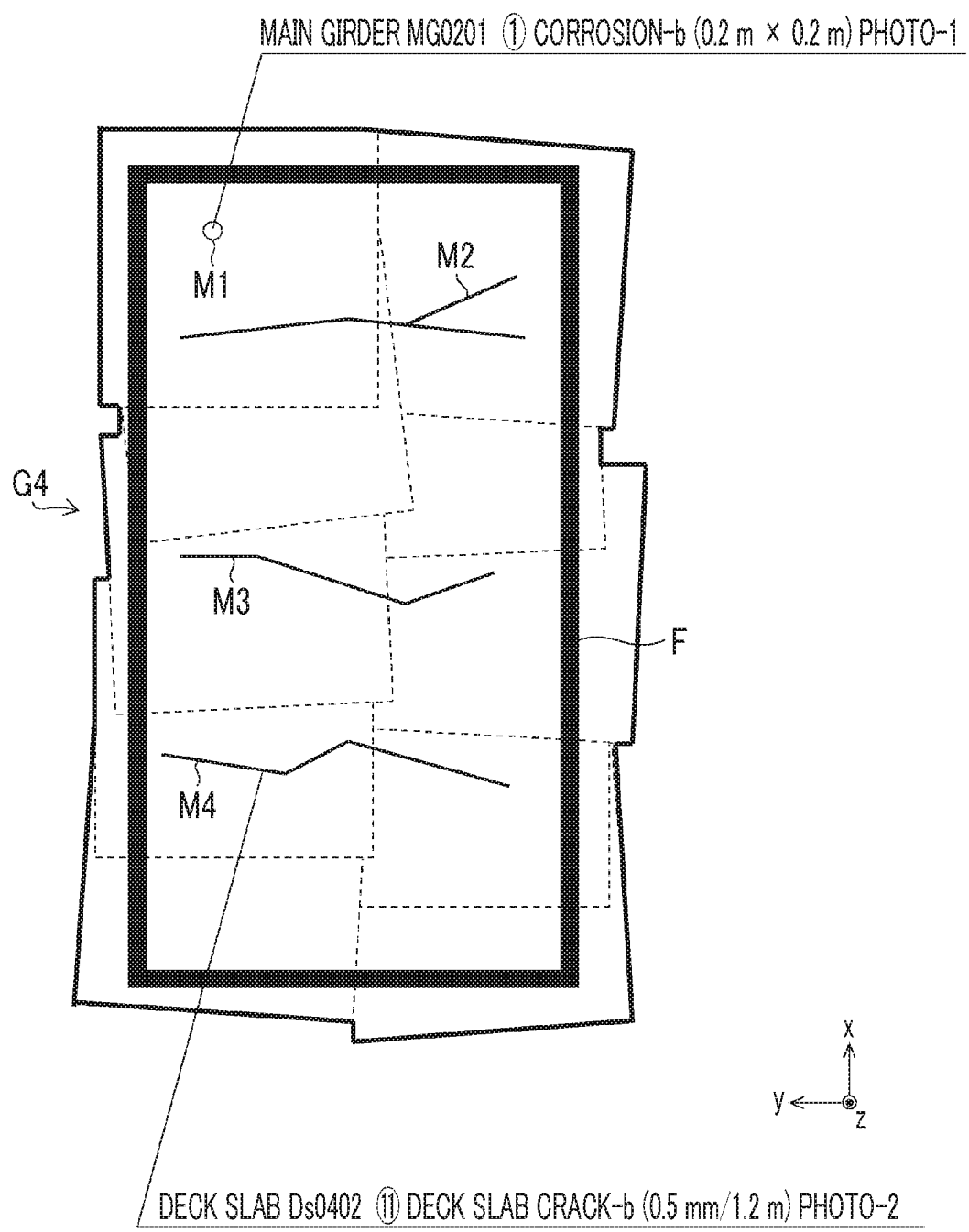
FIG. 22 is a diagram showing an example of a damage mapped image.

The processing unit 210 (the damage mapping unit 210F) maps the measurement result of damage to the composite image (Step S122). Mapping can be performed, for example, by displaying a character, a figure, a symbol, or the like associated with the measurement result on the composite image. The displayed character, figure, symbol, or the like can be selected by an operation through the operating unit 240 (the keyboard 242 and/or the mouse 244), and the processing unit 210 (the display controller 210G) makes the monitor 232 display the measurement result according to the selection. The character, the figure, the symbol, or the like may simplify or enhance actual damage or may be displayed in different aspects according to the classification, size, or the like of damage. FIG. 22 is a diagram showing an image G4 in which the measurement result is mapped to the image G3a, and displays a circular figure M1 indicating a position and a size of corrosion and linear figures M2 to M4 indicating the number of cracks, and positions and lengths of cracks. The image to which the measurement result is mapped as in FIG. 22 is stored in the storage unit 220 (the damage mapped image 220E of FIG. 4), and is displayed on the monitor 232 under the control of the display controller 210G.

Such mapping of the measurement result may be performed on drawing data (for example, computer-aided design (CAD) data) including diagram information indicating size information of the bridge 1. In this case, in a case where a coordinate system defining CAD data is different from a coordinate system shown in FIG. 22 or the like, coordinate transformation (movement, rotation, mirroring, or the like) according to the relationship of the coordinate systems. Such transformation can be performed by the processing unit 210 (the damage mapping unit 210F).

<Input of Damage Information>

In the image processing system 10, the damage information can be input for the mapped measurement result. The input of the damage information is performed based on a user's operation through the display unit 230 and the operating unit 240 (the keyboard 242 and/or the mouse 244) by the processing unit 210 (the damage measurement unit 210E and the damage mapping unit 210F). In FIG. 22, an aspect in which information (a member name, a classification, a size, and a length of damage, and an image number) of damage is input to leader lines to the figures M1 and M4 is shown. The input damage information is stored in the storage unit 220, for example, in a format shown in FIG. 23 (the damage information 220D of FIG. 4), and is displayed on the monitor 232 based on a user's instruction through the display unit 230 and the operating unit 240 under the control of the display controller 210G. It is preferable that the contents and format of information input as the damage information follow a bridge periodic inspection guideline (June, 2014) prepared by the Ministry of Land, Infrastructure, and Transport.

As described above, in the image processing system 10 according to the embodiment, it is possible to enable rapid and easy designation of the correspondence points and image composition based on the designated correspondence points, and to perform extraction and measurement of damage based on a composed image.

Although the embodiment of the invention has been described above, the invention is not limited to the above-described embodiment, and may have various modifications without departing from the spirit of the invention.

EXPLANATION OF REFERENCES

1: bridge
2: main girder
3: cross beam
4: cross frame
5: lateral frame
6: deck slab
10: image processing system
100: digital camera
110: imaging optical system
130: wireless communication unit
132: antenna
200: system body
210: processing unit
210A: image input unit
210B: image composition unit
210C: image arrangement decision unit
210D: correspondence point designation unit
210E: damage measurement unit
210F: damage mapping unit
210G: display controller
210H: wireless communication unit
210I: ROM
212: antenna
220: storage unit
220A: captured image
220B: composition information
220C: composite image
220D: damage information
220E: damage mapped image
230: display unit
232: monitor
240: operating unit
242: keyboard
244: mouse
A: area
A1: area
Ai: area
Aj: area
An: area
F: frame
G1: image group
G2: image group
G3: image
G3a: image
G4: image
G0: panel
M1: figure
M2: figure
M3: figure
M4: figure
MF: main folder OL: area
S100 to S122: steps of image composition method
SF1: subfolder
SF2: subfolder
SF3: subfolder
SF4: subfolder
SF5: subfolder
i1: image
i2: image
i3: image
i4: image
i5: image
i6: image
i7: image
i8: image
i9: image
i10: image

What is claimed is:

1. An image composition method comprising:
 a step of receiving a plurality of images acquired by subjecting a subject to split imaging;
 a step of composing the plurality of images based on correspondence points of images;
 a step of determining all of the plurality of images are unable to be composed into one image;
 a step of dividing the plurality of images into composable image groups;
 a step of deciding an image arrangement based on correspondence points of images by image group;
 a step of making a display device display the plurality of images in the decided image arrangement by image group;
 a step of designating, by a user operation, correspondence points for one image group among the displayed image groups and another image group among the image groups; and
 a step of composing the one image group and the other image group based on the designated correspondence points.

2. The image composition method according to claim 1, wherein, in the step of deciding the image arrangement, a reference image to be a reference of projective transformation among the plurality of images is set, a projective transformation matrix of an image other than the reference image among the plurality of images with respect to the reference image is calculated based on the correspondence points of the images, and the image arrangement is decided based on the calculated projective transformation matrix.

3. The image composition method according to claim 1, wherein, in the step of deciding the image arrangement, an image arrangement, in which images do not overlap each other, is decided.

4. The image composition method according to claim 1, wherein, in the step of deciding the image arrangement, an image arrangement, in which overlapping areas between images overlap each other, is decided.

5. The image composition method according to claim 1, further comprising:
 a step of composing images by image group,
 wherein, in the step of displaying the plurality of images, the plurality of images are displayed with an image composed by image group.

6. The image composition method according to claim 5, wherein, in the step of composing the images by image group, in an area where a plurality of images overlap one another, one of the plurality of overlapping images is selected and the images are composed.

7. The image composition method according to claim 1, further comprising:
 a step of changing a relative arrangement between the image groups based on a user's instruction input,
 wherein, in the step of displaying the plurality of images, the plurality of images are displayed in the changed relative arrangement.

8. The image composition method according to claim 1, wherein, in the step of receiving the plurality of images, a plurality of images acquired by subjecting a structure as the subject to split imaging are received.

9. An image composition device comprising:
 an image input unit that receives a plurality of images acquired by subjecting a subject to split imaging;
 an image composition unit that composes the plurality of images based on correspondence points between images;
 an image arrangement decision unit that determines the plurality of images are unable to be composed into one image, divides the plurality of images into composable image groups, and decides an image arrangement based on correspondence points between images by image group;
 a display controller that makes a display device display the plurality of images in the decided image arrangement by image group; and
 a correspondence point designation unit that designates, by a user operation, correspondence points for one image group among the displayed image groups and another image group among the image groups,
 wherein the image composition unit composes the one image group and the other image group based on the designated correspondence points.

10. The image composition device according to claim 9, wherein the image arrangement decision unit sets a reference image to be a reference of projective transformation among the plurality of images, calculates a projective transformation matrix of an image other than the reference image among the plurality of images with respect to the reference image based on the correspondence points between the images, and decides the image arrangement based on the calculated projective transformation matrix.

11. The image composition device according to claim 9, wherein the image composition unit composes images by image group, and
 the display controller makes the plurality of images be displayed with an image composed by image group.

12. The image composition device according to claim 9, wherein the image arrangement decision unit changes a relative arrangement between the image groups based on a user's instruction input, and
 the display controller makes the plurality of images be displayed in the changed relative arrangement.

13. A non-transitory recording medium in which a computer-readable code of a program causing a computer to execute the image composition method according to claim 1 is recorded.

* * * * *